(12) United States Patent
Yu et al.

(10) Patent No.: US 11,941,553 B1
(45) Date of Patent: Mar. 26, 2024

(54) METHODS, ELECTRONIC DEVICES AND STORAGE MEDIA FOR SHIP ROUTE OPTIMIZATION

(71) Applicants: HEFEI UNIVERSITY OF TECHNOLOGY, Anhui (CN); ANHUI CONSTRUCTION ENGINEERING TRAFFIC & SHIPPING GROUP CO., LTD., Anhui (CN)

(72) Inventors: Jingyu Yu, Hefei (CN); Jingfeng Wang, Hefei (CN); Wei Lin, Hefei (CN); Yuxue Pu, Hefei (CN); Yongchao Zhu, Hefei (CN); Zhenxuan Li, Hefei (CN); Qiong Zhang, Hefei (CN); Yuming Zhang, Hefei (CN); Yonggen Gu, Hefei (CN); Zheng Qiu, Hefei (CN)

(73) Assignees: HEFEI UNIVERSITY OF TECHNOLOGY, Hefei (CN); ANHUI CONSTRUCTION ENGINEERING TRAFFIC & SHIPPING GROUP CO., LTD., Hefei (CN)

( * ) Notice: Subject to any disclaimer, the term of this patent is extended or adjusted under 35 U.S.C. 154(b) by 0 days.

(21) Appl. No.: 18/347,557

(22) Filed: Jul. 5, 2023

(30) Foreign Application Priority Data

Dec. 28, 2022 (CN) .......................... 202211688245.9

(51) Int. Cl.
G05D 1/02 (2020.01)
G01C 21/20 (2006.01)
(Continued)

(52) U.S. Cl.
CPC ......... *G06Q 10/047* (2013.01); *G01C 21/203* (2013.01); *G06Q 10/0635* (2013.01)

(58) Field of Classification Search
CPC ...... G05D 1/02; G05D 1/0214; G05D 1/0219; G05D 1/0221; G06Q 10/047; G06Q 10/0635; G01C 21/203
(Continued)

(56) References Cited

U.S. PATENT DOCUMENTS 5,655,147 A * 8/1997 Stuber ................... G06F 13/124
710/7
2016/0259077 A1 9/2016 Chene
(Continued)

FOREIGN PATENT DOCUMENTS

CN 110160526 A 8/2019
CN 110849370 A 2/2020
(Continued)

OTHER PUBLICATIONS

Wang, Zikai, et al. "An Improved Sparrow Search Algorithm for Global Optimization with Customization-Based Mechanism." Axioms 12.8 (2023): 767. (Year: 2023).*
(Continued)

Primary Examiner — Cuong H Nguyen
(74) Attorney, Agent, or Firm — METIS IP LLC

(57) ABSTRACT

The embodiment of the present disclosure discloses a method, an electronic device, and a storage medium for a ship route optimization. The method for the ship route optimization considers a dynamic feature of a multi-functional emergency rescue ship and an interference effect caused by an airflow, uses a movement model with kinematics non-holonomic constraints, such as a ship total cost assessment function to simulate the movement of the ship, and based on a sparrow search algorithm, learns how to apply the algorithm to a route plan of the emergency rescue ship. The method can improve the ship route optimization algorithm, improve an accuracy and practical applicability
(Continued)

Scenario 1 of a calculated plan. The method can effectively and accurately locate obstacles and hidden reefs, and consider effects of an airflow and a non-holonomic constraint effect, so as to make the route planning of the ship more efficient and intelligent.

8 Claims, 8 Drawing Sheets

(51) Int. Cl.
  *G06Q 10/047* (2023.01)
  *G06Q 10/0635* (2023.01)
(58) Field of Classification Search
  USPC .......................................................... 701/21
  See application file for complete search history.

(56) References Cited

U.S. PATENT DOCUMENTS

| | | | |
|---|---|---|---|
| 2017/0090482 A1 | 3/2017 | Zammit-Mangion et al. | |
| 2020/0327378 A1* | 10/2020 | Smith | G06N 5/048 |
| 2022/0036738 A1 | 2/2022 | Liu et al. | |
| 2022/0044097 A1* | 2/2022 | Si | G06N 3/0475 |
| 2022/0057803 A1 | 2/2022 | Sorin et al. | |

FOREIGN PATENT DOCUMENTS

| | | | | |
|---|---|---|---|---|
| CN | 112362067 A | | 2/2021 | |
| CN | 112461247 A | | 3/2021 | |
| CN | 112880688 A | | 6/2021 | |
| CN | 113156947 A | | 7/2021 | |
| CN | 113778093 A | | 12/2021 | |
| CN | 114460941 A | | 5/2022 | |
| CN | 114485665 A | * | 5/2022 | ............. G01C 21/20 |
| CN | 114610027 A | | 6/2022 | |
| CN | 114708435 A | * | 7/2022 | |
| CN | 115204052 A | * | 10/2022 | |
| CN | 115616923 A | * | 1/2023 | |
| CN | 115657693 B | * | 3/2023 | ............... G05D 1/02 |
| CN | 116055992 A | * | 5/2023 | |
| CN | 116061173 A | * | 5/2023 | ............... B25J 9/16 |
| JP | 2022183416 A | * | 12/2022 | ............. G01S 19/53 |

OTHER PUBLICATIONS

Q. Liang, B. Chen, H. Wu and M. Han, "A Novel Modified Sparrow Search Algorithm Based on Adaptive Weight and Improved Boundary Constraints," 2021 IEEE 6th International Conference on Computer and Communication Systems (ICCCS), Chengdu, China, 2021, pp. 104-109, doi: 10.1109/ICCCS52626.2021.9449311. (Year: 2021).*
C. Wang, K. Yu, K. Zhang, J. Bu and F. Qu, "Significant Wave Height Retrieval Based on Multivariable Regression Models Developed With CYGNSS Data," in IEEE Transactions on Geoscience and Remote Sensing, vol. 61, pp. 1-15, 2023, Art No. 4200415, doi: 10.1109/TGRS.2022.3233102. (Year: 2023).*
Meng, K., Chen, C. & Xin, B. MSSSA: a multi-strategy enhanced sparrow search algorithm for global optimization. Front Inform Technol Electron Eng 23, 1828-1847 (2022). https://doi.org/10.1631/FITEE.2200237 (Year: 2022).*
Li, Bin, et al. "Path Planning of Multi-Objective Underwater Robot Based on Improved Sparrow Search Algorithm in Complex Marine Environment." Journal of Marine Science and Engineering 10.11 (2022): 1695. (Year: 2022).*
Zhang, Jinpeng, et al. "Adaptive Collision Avoidance for Multiple UAVs in Urban Environments." Drones 7.8 (2023): 491. (Year: 2023).*
Fu, Longtian, et al. "Unmanned Driving Technology in Coal Mine Based on Semantic Information Method." IEEE Access 11 (2023): 28330-28342.*
Ramalingam, M., et al. "A Comprehensive Analysis of Blockchain Applications for Securing Computer Vision Systems." IEEE Access (2023). (Year: 2023).*
Ma, Bing, et al. "Enhanced sparrow search algorithm with mutation strategy for global optimization." IEEE Access 9 (2021): 159218-159261. (Year: 2021).*
Translated version of Lin et al CN 113778093 A (Year: 2021).*
First Office Action in Chinese Application No. 202211688245.9 dated Feb. 3, 2023, 15 pages.
Decision to Grant a Patent in Chinese Application No. 202211688245.9 dated Feb. 23, 2023, 6 pages.
Shu, Hong, Application of Sparrow Search Algorithm in Path Planning, Information: Technology and Application, 2022, 5 pages.
Yu, Hui et al., Multi-Objective AUV Path Planning in Large Complex Battlefield Environments, 2014 Seventh International Symposium on Computational Intelligence and Design, 345-348, 2014.

* cited by examiner

METHODS, ELECTRONIC DEVICES AND STORAGE MEDIA FOR SHIP ROUTE OPTIMIZATION

CROSS-REFERENCE TO RELATED APPLICATION

This application claims priority to Chinese application No. 202211688245.9 filed on Dec. 28, 2022, the entire content of which is hereby incorporated by reference.

TECHNICAL FIELD

The present disclosure relates to the technical field of ship route optimization, in particular to a method, electronic device, and medium for a ship route optimization.

BACKGROUND

In a process of emergency rescue and disaster relief, a movement of an emergency rescue ship is easily affected by an airflow and various environmental interference factors, particularly in an extreme weather. The airflow can seriously affect an operation state of the ship and reduce a rescue speed.

Furthermore, it is worth noting that most ships are under-actuated systems, meaning that the degrees of freedom in their movement are greater than the number of controllable modes. Unactuated movements of the ship are constrained by inherent properties of its motion, such as minimum curvature or maximum steering rate limitations. These constraints restrict the ship's movement, ultimately resulting in a decrease in its overall speed. A global route planning and dynamic programming is a common solution at present, but in a high-dimensional system, the solution may take up too much computational cost. Although a computational complexity may be reduced by reducing a state size of a system environment, it may also lead to the generation of routes that are impassable for an unactuated ship, and accordingly, the unactuated ship cannot effectively navigate and follow these routes.

Based on the above technical problems, it is necessary and practical to carry out a targeted research on a method for ship route optimization based on the effect of an airflow movement and a nonholonomic movement constraint.

SUMMARY

In order to avoid and overcome the technical problems existing in the prior art, this present disclosure provides a method for ship route optimization. The present disclosure considers the dynamic features of multi-functional emergency rescue ships and an interference effect caused by an airflow, and considers the airflow and non-holonomic constraint effects. The method provided in the present disclosure may effectively and accurately locate obstacles and hidden reefs, make the ship route planning more efficient and intelligent.

In order to achieve the above object, the present disclosure provides the following technical solutions:

One of the embodiments of the present disclosure provides a method for ship route optimization performed based on a processor, and the method includes: S1: controlling a ship positioning system to obtain positioning data of a ship in real time; in response to receiving a route optimization requirement, constructing, based on the positioning data obtained from the ship positioning system, a navigation environment where the ship navigates; setting a navigation condition of the ship in the navigation environment; and adding a risk area that poses a risk of interference to the ship in the navigation environment; S2: determining a ship route of the ship, and establishing a navigation time optimization target function and a ship route risk assessment function of the ship in the ship route. The ship route is generated based on the navigation environment; and the navigation time optimization target function takes a navigation time as a variable, and the ship route risk assessment function takes a navigation risk as a variable; S3: determining, based on a sparrow search algorithm, a flying distance of a sparrow and a corresponding fitness value; S4: substituting the flying distance into the navigation time optimization target function, and the fitness value into the ship route risk assessment function, generating a sparrow total cost assessment function, and determining a minimum value of the sparrow total cost assessment function; and determining a sparrow flying route corresponding to the minimum value as an optimal ship route.

One of the embodiments of the present disclosure provides an electronic device, including a processor, an input device, an output device, and a memory connected in sequence, the memory being used to store a computer program, the computer program including program instructions; the processor being used to call the program instructions to execute the aforementioned method for ship route optimization.

One of the embodiments of the present disclosure provides a non-transitory storage medium storing a computer program, the computer program including program instructions. When the program instructions are executed by a processor, the processor executes the method for ship route optimization.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
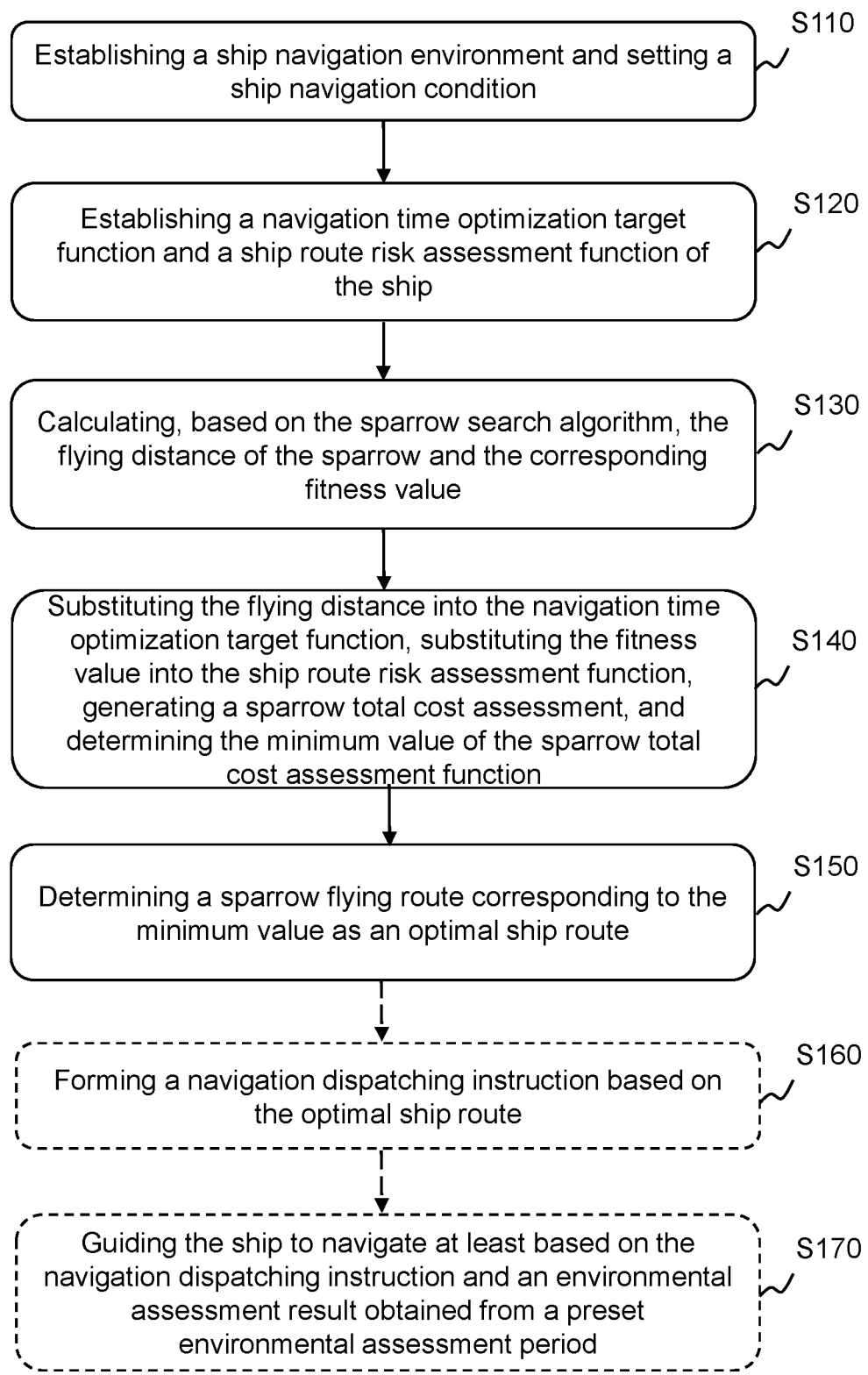
FIG. 1 is a flowchart illustrating a method for a ship route planning according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "device," "unit," and/or "module" used herein are one method to distinguish different components, elements, parts, sections, or assemblies of different levels. However, if other words may achieve the same purpose, the words may be replaced by other expressions.

As used in the present disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the preceding or following operations of the flowchart may not necessarily be implemented in order. Instead, each operation may be processed in reverse or simultaneously. Meanwhile, other operations may also be added to these processes, or a certain operation or several operations may be removed from these processes.

The following will clearly and completely describe the technical solutions in the embodiments of the present disclosure with reference to the drawings of the embodiments of the present disclosure. Based on the embodiments in the present disclosure, all other embodiments obtained by those skilled in the art without creative efforts fall within the protection scope of the present disclosure.

The embodiments of the present disclosure relates to a method for a ship route planning based on a sparrow search algorithm. The method may be used for the ship route planning in various scenarios, including but not limited to the following scenarios: an emergency rescue ship route planning, a cargo ship route planning, a passenger ship route planning, etc.

Before introducing the embodiments of the present disclosure in detail, first a core algorithm in the embodiments of the present disclosure is introduced, that is, the sparrow search algorithm (SSA). When the processor executes the algorithm, the operations are as follows:

Operation 1: initializing a sparrow population.

Operation 2: calculating fitness values of sparrows, and sorting the fitness values to find a current optimal fitness individual and a current worst fitness individual.

In some embodiments, the fitness value of the sparrow may be used to measure the sparrow's ability to find food. In some embodiments, the optimal fitness individual may be the sparrow with the highest fitness value, which may have a higher ability to find food in different environments. The worst fitness individual may be the sparrow with the lowest fitness value, which has a lower ability to find food in different environments.

In some embodiments, the sparrows may be classified based on their fitness values, such as classifying the sparrows with higher fitness as discoverers and the sparrows with lower fitness as followers.

Operation 3: using formula (3) to update a position of the sparrow with higher fitness (the discoverer), and obtaining a current updated position of the discoverer.

Operation 4: using formula (4) to update the position of the sparrow with lower fitness (the follower), and obtaining the current updated position of the follower.

Operation 5: using formula (5) to randomly update the position of a sparrow (vigilante), and obtaining the current updated position of the vigilante.

For the specific content of the above formula (3) to formula (5), please refer to the following descriptions.

Operation 6: comparing the updated positions of the discoverer, the follower, and the vigilante with their respective initial positions, respectively, in response to that the routes between the current positions and the initial positions are shorter than the routes between the positions before the update and the initial positions, recording the current positions as the final positions; otherwise, recording the positions before the update as the final positions, so as to determine the final positions of the discoverer, the follower and the vigilante respectively.

Operation 7: repeating operations 3 to 6 until finding out the discoverer, the follower, and the vigilante whose current positions (that is, the final position determined in operation 6) are closest to their initial positions, and calculating their fitnesses.

In some embodiments, the above-mentioned sparrow search algorithm may be pre-stored in the processor or a storage device, and the processor may directly call the algorithm when the algorithm needs to be performed.

In a simulation experiment, the sparrow search algorithm needs to use virtual sparrows to search for food, and establish a sparrow population matrix X formed by n n discoverers a, h followers b, and m vigilantes c (as shown in the following formula (1)):

$$X = \begin{bmatrix} a_1^1 & \cdots & a_1^d \\ \vdots & \ddots & \vdots \\ a_n^1 & \cdots & a_n^d \\ b_1^1 & \cdots & b_1^d \\ \vdots & \ddots & \vdots \\ b_h^1 & \cdots & b_h^d \\ c_1^1 & \cdots & c_1^d \\ \vdots & \ddots & \vdots \\ c_m^1 & \cdots & c_m^d \end{bmatrix} \quad (1)$$

where, each line in X indicates all the positions of the corresponding sparrow individual in the sparrow population in a flight, which indicates a flying route. The flying route corresponds to a ship route, and each position corresponds to a navigation segment; d indicates a dimensionality of the to-be-optimized problem variable, that is, a total number of flying route segments of the sparrow in the flight.

a indicates the discoverers, n indicates the number of discoverers; $a_n^1$ indicates the position of the nth discoverer in the first dimension, that is, an initial position of the discoverer in this flight; $a_n^d$ indicates the position of the nth discoverer in the dth dimension, that is, the end position of the discoverer in this flight.

b indicates the follower, h indicates the number of followers; $b_h^1$ indicates the position of the hth follower in the first dimension, that is, the initial position of the follower in this flight; $b_h^d$ indicates the position of the hth follower in the dth dimension, that is, the end position of the follower in this flight.

c indicates the vigilante, m indicates the number of vigilantes; $c_m^1$ indicates the position of the mth vigilante in the first dimension, that is, the initial position of the vigilante in this flight; $c_m^d$ indicates the position of the mth vigilante in the dth dimension, that is, the end position of the vigilante in this flight.

In some embodiments, the processor may calculate a flying distance of the sparrow according to a position change of the sparrow during a flying process, and establish a fitness value matrix F of the sparrow according to the flying distance of the sparrow expressed as the following formula (2):

$$F = \begin{vmatrix} f[a_1^1 \ a_1^2 \ \cdots \ a_1^d] \\ \vdots \\ f[a_n^1 \ a_n^2 \ \cdots \ a_1^d] \\ f[b_1^1 \ b_1^2 \ \cdots \ b_1^d] \\ \vdots \\ f[b_h^1 \ b_h^2 \ \cdots \ b_h^d] \\ f[c_1^1 \ cc_1^2 \ \cdots \ c_1^d] \\ \vdots \\ f[c_m^1 \ c_m^2 \ \cdots \ c_m^d] \end{vmatrix} \quad (2)$$

where, $f[\ ]$ indicates a calculation function of the sparrow fitness value, and the $f$ value of each row in F is indicated as the fitness value of the corresponding individual in the sparrow population. In the sparrow search algorithm, the discoverer with a good fitness value may obtain food first, that is, reach the end position of the flying route during the search process.

In some embodiments, a dimensionality d of the to-be-optimized problem variable is determined based on a ship maneuverability. The ship maneuverability includes at least one of a maximum speed, a maximum turning angle, and a maximum turning angle rate.

In some embodiments, the problem to be optimized may be the planning of the ship route, and the dimensionality of the problem to be optimized variable may be a division fineness of the ship route. For example, the higher the dimensionality, the finer the ship route finally solved by the processor, and the greater the consumption of algorithm iteration resources. Therefore, it is necessary to find the optimal ship route while considering a resource conservation.

In some embodiments, the ship maneuverability may reflect a sensitivity of the movement of the ship, and may be used to measure a crisis response ability of the ship. Exemplarily, the greater the ship maneuverability, the more sensitive the movement of the ship, which means the ship may move flexibly in a dangerous environment and has a higher crisis response ability. In some embodiments, the maximum speed may be a limit speed that the ship can reach, the maximum turning angle may be the limit angle that the ship can turn when performing one turn, and the maximum turning rate may be the limit angle that the ship can turn within a unit time.

In some embodiments, by checking a table, the processor may find the corresponding ship maneuverability based on identity information of the ship, or the processor may calculate the ship maneuverability based on historical navigation data of the ship.

In some embodiments, the dimensionality d of the to-be-optimized problem variable may be inversely proportional to the ship maneuverability. The lower the ship maneuverability, the greater the dimensionality of the problem to be optimized variable is set. Exemplarily, the ship with a lower ship maneuverability has a poorer crisis response ability, thus requiring a finer ship route to determine a ship navigation route with a higher safety coefficient and avoid accidents during the navigation as much as possible.

Furthermore, the discoverer is responsible for finding food for the entire sparrow population and providing directions for foraging for all followers. Therefore, the discoverer may obtain a greater foraging search range than the follower. During each iteration, the position of the discoverer may be updated by the following position calculation formula (3):

$$\dot{X}_{y,j}^{s+1} = \begin{cases} \dot{X}_{y,j}^s \cdot \exp\left(-\dfrac{y}{\delta \cdot iter_{max}}\right) & R_2 < ST \\ \dot{X}_{y,j}^s + D * L & R_2 \geq ST \end{cases} \quad (3)$$

where, s indicates the current number of iterations, $s \in (1, iter_{max})$, $iter_{max}$ indicates the maximum number of iterations; $\dot{X}_{y,j}^s$ indicates the position occupied by the yth discoverer in the jth dimension in the sth iteration; $\dot{X}_{y,j}^{s+1}$ indicates the position occupied by the yth discoverer in the jth dimension in the (s+1)th iteration; $y \in (1,n)$, $j \in (1,d)$; $\delta \in (0,1)$ is a random number; $R_2$ indicates a warning value; ST indicates a safety threshold; D is a normally distributed random number; L is a one-row d-dimensional unit matrix.

In some embodiments, in operation 4, some followers may monitor the discoverer all the time, once the followers observe that the discoverer has found better food, the follower may compete with the discoverer for food. Once the follower wins, it may obtain the food of the discoverer. The follower's position may be updated by the processor through the following position calculation formula (4):

$$\ddot{X}_{z,j}^{s+1} = \begin{cases} Q*\exp\left(-\dfrac{\ddot{X}_{worst,j}^{s}-\ddot{X}_{z,j}^{s}}{Z^{2}}\right) & z > \dfrac{h}{2} \\ \ddot{X}_{best,j}^{s} + |\ddot{X}_{z,j}^{s} - \ddot{X}_{best,j}^{s}| * A^{+} * L & z \le \dfrac{h}{2} \end{cases} \quad (4)$$

where, $\ddot{X}_{z,j}^{s+1}$ indicates the position occupied by the zth follower in the jth dimension in the (s+1)th iteration, $z \in (1, h)$; $\ddot{X}_{z,j}^{s}$ indicates the position occupied by the zth follower in the jth dimension in the sth iteration; $\ddot{X}_{best,j}^{s}$ indicates the optimal position occupied by all followers in the jth dimension at the sth iteration; $\ddot{X}_{worst,j}^{s}$ indicates the worst position occupied by all followers in the jth dimension at the sth iteration; A+ is an one row d-dimensional matrix with each element being 1 or −1.

In this embodiment, it is assumed that the sparrows (vigilantes) who are aware of danger account for 10% to 20% of the total number. The initial positions of these sparrows are randomly generated in the population. The position of the vigilante may be updated by the processor through the following position calculation formula (5):

$$\ddot{X}_{k,j}^{s+1} = \begin{cases} \ddot{X}_{best,j}^{s} + \mu * |\ddot{X}_{k,j}^{s} - \ddot{X}_{best,j}^{s}| & f_{k,j}^{s} > f_{best,j}^{s} \\ \ddot{X}_{k,j}^{s} + K * \left(\dfrac{|\ddot{X}_{k,j}^{s} - \ddot{X}_{worst,j}^{s}|}{f_{k,j}^{s} - f_{worst,j}^{s} + \varepsilon}\right) & f_{k,j}^{s} \ge f_{best,j}^{s} \end{cases} \quad (5)$$

where, $\ddot{X}_{k,j}^{s+1}$ indicates the position occupied by the kth vigilante in the jth dimension in the (s+1)th iteration, $k \in (1, m)$; $\ddot{X}_{k,j}^{s}$ indicates the position occupied by the kth vigilante in the jth dimension in the sth iteration; $\ddot{X}_{best,j}^{s}$ indicates the optimal position occupied by all vigilantes in the jth dimension at the sth iteration; $\ddot{X}_{worst,j}^{s}$ indicates the worst position occupied by all vigilantes in the jth dimension at the sth iteration; $f_{k,j}^{s}$ indicates the fitness value of the kth vigilante at the jth dimension in the sth iteration; $f_{best,j}^{s}$ indicates the optimal fitness value in the jth dimension among all vigilantes at the sth iteration; $f_{worst,j}^{s}$ indicates the worst fitness value in the jth dimension among all vigilantes at the sth iteration; p is a step size control parameter; $K \in (0,1)$ is a random number; c is a constant.

In some embodiments, the processor may apply the sparrow search algorithm to the field of ship route planning in scenarios such as an emergency rescue. FIG. 1 is a flowchart illustrating a method for a ship route planning according to some embodiments of the present disclosure. As shown in FIG. 1, the operations performed by a processor are as follows:

In S110, establishing a ship navigation environment and setting a ship navigation condition.

In some embodiments, the processor may control a ship positioning system to obtain positioning data of the ship in real time; in response to receiving a route optimization requirement, constructing, based on the positioning data obtained from the ship positioning system, a navigation environment where the ship navigates, setting a navigation condition of the ship in the navigation environment, and adding a risk area that poses a risk of interference to the above-mentioned ship underway.

In some embodiments, a form of the positioning data of the ship may include position coordinates, an image positioning, etc. In some embodiments, the ship positioning system may use positioning devices such as a global position system (GPS) positioning information receiving device, a remote sensing, a position sensor, a distance sensor, and a direction sensor, etc. to obtain the position of the ship at the current moment, thereby determining the positioning data of the ship. For a specific description of the ship positioning system, please refer to the following FIG. 11 and the related descriptions.

In some embodiments, the route optimization requirement may include information such as a target point, an arrival time, and a route of a ship to be optimized. In some embodiments, the processor may receive the route optimization requirement manually input by a user, or the route optimization requirement sent by other terminal devices (e.g., a user terminal), so as to optimize a ship navigation route.

The ship navigation environment may reflect a navigation state of the ship and the environmental state. In some embodiments, the processor may construct or simulate the ship navigation environment at a current moment and/or within a preset time period in the future according to the current position of the ship, so as to predict the ship route.

In some embodiments, the processor may establish an environment model to simulate the navigation environment of the ship. Constructing the navigation environment where the ship navigates is a basic premise for determining whether the ship can successfully complete a task. Such as determining whether an emergency rescue ship may successfully complete a rescue task.

In some embodiments, the processor may generate the navigation environment when the ship is navigating. For example, the processor may set inland waters where the ship navigates as a two-dimensional (2D) space, and establish a 2D coordinate system in the 2D space to generate the navigation environment.

In some embodiments, after the navigation environment is generated, the processor needs to set the navigation condition of the ship in the navigation environment, and add a risk area that poses a risk of interference to the navigating ship in the navigation environment.

The navigation condition of the ship may include obstacles in the inland waters, a starting point, and a target point of the ship navigation. The navigation condition may be used to constrain the ship navigation route, so that the ship may bypass the obstacles in the inland waters from the starting point of the ship navigation, and reach the target point of the ship navigation.

In some embodiments, the starting point of the ship navigation may be the current position of the ship, and the target point of the ship navigation may include an end point of the ship, such as a rescue point. For specific implementations of the obstacles, the starting point, and the target point, please refer to FIGS. 5-6 and the related descriptions.

In some embodiments, the processor may set coordinates corresponding to the obstacles in the 2D coordinate system based on sizes, a number, and positions of the obstacles in the inland waters; and determine the coordinates of the starting point and the coordinates of the target point of the ship navigation;

For example, the processor may set the inland water as a 2D space and establish a 2D coordinate system. The inland waters may be the navigation area of waters where the ship navigates. Exemplarily, the processor may take the connection between the starting point and the end point of the ship as an axis, and use all waters within a preset radius from the axis as the inland waters. Lengths of the inland waters may be projection lengths of the inland waters on the x-axis of the 2D coordinate system, and widths of the inland waters may be the projection widths of the inland waters on the y-axis of the 2D coordinate system.

In some embodiments, the processor may divide the inland water with a length X and a width Y in the 2D coordinate system, and divide the inland water into g×r numbers of square areas with a side length u. Then the following formula (6) may be obtained:

$$u = \frac{X}{r} = \frac{Y}{g} \quad (6)$$

where, X indicates the length of an inland water in the 2D coordinate system; Y indicates the width of the inland water in the 2D coordinate system; u indicates a side length of the square area; r indicates the number of the square areas in the length direction of the inland rive; g indicates the number of the square area in the width direction of the inland water; As an example only, the processor may set both X and Y to be 20, both r and g to be 20, and u to be 1.

In some embodiments, the processor may determine an obstacle area and a navigable area, the obstacle region is an area with the obstacle, and the navigable area is an area without the obstacle. In some embodiments, the processor may determine a risk area and a safe area based on the navigable area. For example, the processor may determine that the risk area is an area affected by an airflow, and the safe area is a navigation free area without the influence of the airflow.

Figure 3:
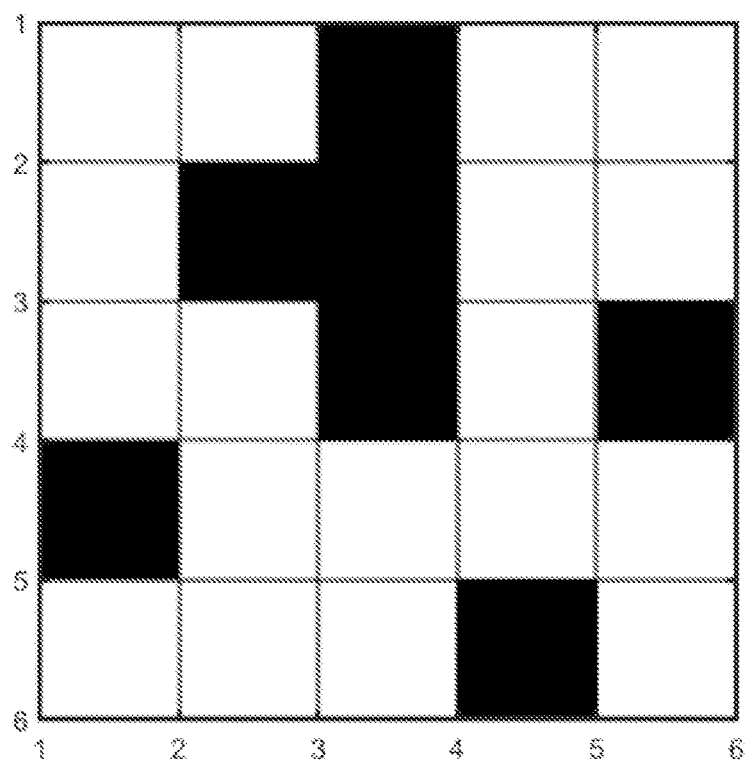
FIG. 3 is a grid diagram illustrating a ship movement environment according to some embodiments of the present disclosure.

As an example, as shown in FIG. 3, the processor may divide grids (the square areas) into obstacle grids (obstacle areas) and free grids (navigable areas) according to a nature of the environment of the inland waters. The free grids are shown in white, and the obstacle grids are shown in black.

For example, common obstacles mainly include bridges, reefs, islands, shore bases, water structures, etc. The positions of these obstacles may be indicated by the black obstacle grids. When conducting simulation experiments such as a Matlab simulation, the processor may discretize the grid, that is, a grid map is represented by a matrix, in which the black obstacle grid represents bit 1, and the white free grid represents bit 0.

Figure 4:
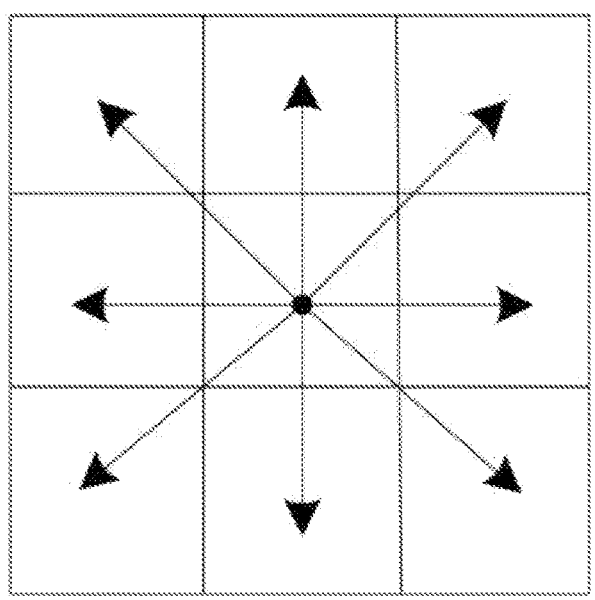
FIG. 4 is a grid diagram illustrating a ship movement course according to some embodiments of the present disclosure.

In some embodiments, the ship often encounters areas such as high air currents and high waves that affect navigation during the rescue, these areas may be called high-risk areas, that is, the risk areas. These high-risk areas may affect a task execution efficiency of the ship, such as the rescue efficiency of the rescue ship. In this embodiment, it is assumed that the rescue multifunctional ship has only 8 moving directions. As shown in FIG. 4, namely: east, west, south, north, southeast, northeast, southwest, northwest. If the side length of each unit grid is 1, the step size of the rescue ship movement is 1 or $\sqrt{2}$.

In some embodiments, the obstacles in the inland waters may include a suspicious object whose probability of affecting the ship navigation satisfies a preset condition. The suspicious object may be located above and/or below the waters.

In some embodiments, the suspicious object may be an object to be determined above and/or below the water area determined by using a three-dimensional (3D) modeling. The object needs to be further simulated to determine whether it may affect the ship navigation. In some embodiments, the suspicious object may include a reef, a structure on water, a coral, an aquatic plant, or an underwater sediment.

In some embodiments, the preset condition may be that the probability that the suspicious object affects the ship navigation exceeds a preset probability threshold. Satisfying the preset condition means that the suspicious object is likely to affect the navigation, and in serious situations, it may also prevent the ship navigation.

In some embodiments, the processor may perform the 3D modeling on the ship and the suspicious object in the inland waters based on a modeling unit. A result of the 3D modeling may be imported into a simulation unit, and a minimum preset number of times for the ship to pass through the waters with the suspicious object may be controlled in the simulation unit. In response to that the number of times the ship is affected by the suspicious object during the navigation exceeds a preset threshold, the suspicious object may be determined to be the obstacle in the inland waters.

In some embodiments, the modeling unit may be a unit module in a processor that implements a modeling function. The modeling unit may be implemented by modeling software. In some embodiments, the processor may perform the 3D modeling based on the size and position of the suspicious object in the inland waters obtained by the modeling unit, and the obtained 3D model may intuitively display a 3D distribution state of the suspicious object and the ship in the inland waters.

In some embodiments, the simulation unit may be a unit module in the processor that simulates the navigation function of the ship. The simulation unit may be implemented by simulation software. Exemplarily, the processor may use the simulation unit to control the ship obtained by modeling to perform a virtual navigation in the 3D modeling based on the 3D modeling result, and control the ship to pass through the water area containing the suspicious object for at least a preset number of times, so as to determine whether the suspicious object may affect the virtual ship navigation. If the number of times the virtual ship is affected by the suspicious object exceeds the preset threshold, it reflects that the suspicious object has a high probability of affecting the ship navigation, so that the processor may determine the suspicious object as the obstacle in the inland waters. Further, the water area where the obstacle is located may be determined as an obstacle water area.

In S120, establishing a navigation time optimization target function and a route risk assessment function of the ship (also referred to as ship route risk assessment function).

In some embodiments, the processor may determine the ship route, and establish a navigation time optimization target function and a ship route risk assessment function of the ship in the ship route. The ship route is generated based on the ship navigation environment. The navigation time optimization target function takes a navigation time as a variable, and the ship route risk assessment function takes a navigation risk as the variable.

In some embodiments, the processor may determine the ship route based on the distribution of the obstacle area, the safe area, and the risk area in the ship navigation environment.

In some embodiments, the distribution of the obstacle area, the safe area, and the risk area includes a position distribution of each area in the inland waters, which reflects whether or how safe a ship may travel in the above areas. In some embodiments, the processor may control the ship to avoid the obstacle area, to navigate in the safe area as much as possible, and to navigate in the risk area as little as possible according to the distribution of the above-mentioned areas, so as to determine the ship route.

In some embodiments, the processor may construct the navigation time optimization target function and the ship route risk assessment function, and minimize the navigation time optimization target function and the ship route risk assessment function, thereby obtaining a ship total cost assessment function. A normalized cost function is used as a track assessment index.

For example, the processor may take the navigation time of the ship as the variable to establish the navigation time optimization target function of the ship on the ship route.

In some embodiments, the processor designs the navigation time optimization target function as shown in formula (7) considering the influence of the navigation time of the ship in the risk area.

$$J_{TC} = \left[1 + \frac{1 - \exp(-0.2 \times T_{C,alarm})}{1 + \exp(-0.2 \times T_{C,alarm})}\right] \times T_{C,total} \quad (7)$$

where, $T_{C,total}$ indicates a total navigation time of the ship navigating along the ship route; $T_{C,alarm}$ indicates a ship warning time, i.e., a time when the ship navigates in the risk area on the ship route. In some embodiments, when the warning time $T_{C,alarm}$ is 0, a function value of the navigation time optimization target function $J_{TC}$ is equal to $T_{C,total}$.

When the emergency rescue ship navigates in an extreme weather, two major objective factors may affect a safety of the ship, namely a static obstacle and a dynamic obstacle, as well as an airflow condition in an extremely harsh environment. This embodiment mainly considers the second type of risk factor, that is, the air flow condition, and establishes a risk assessment formula for a ship route. In some embodiments, the processor may take a navigation risk of the ship navigating in the risk area as a variable to establish the ship route risk assessment function for the ship on the ship route, and the calculation formula (8) is as follows:

$$r_{C,risk} = \frac{1}{Q}\sum_{i=1}^{Q}\left(\alpha_C \times \frac{H_{C,i,wave}}{H_{C,max,wave}} + \beta_C \times \frac{V_{C,i,wind}}{V_{C,max,wind}}\right) \quad (8)$$

where, $\alpha_C + \beta_C = 1$, $\alpha_C$ indicates a coefficient of an influence level of a wave height on a ship navigation risk; $\beta_C$ indicates the coefficient of an influence level of a wind speed on the ship navigation risk; $r_{C,risk}$ indicates a risk value in the ship route; Q indicates a number of a total route segments in the ship route; $H_{C,i,wave}$ indicates the wave height of the ith route segment in the ship route; $H_{C,max,wave}$ indicates the maximum wave height in the total route segments of the ship route; $V_{C,i,wind}$ indicates the wind speed of the i-th route segment in the ship route; $V_{C,max,wind}$ indicates the maximum wind speed in the total route segments of the ship route.

In some embodiments, the risk value in the ship route may be used to assess the influence level of the interference factors (e.g., the air flow, the wind speed, the water wave height, etc.) of the ship in the segments of the ship route. Taking the above formula (8) as an example, the closer the wave height of the ith route segment is to the maximum wave height, the higher the wave height in the water area, and the greater the navigation interference of the ship, resulting in a greater risk value in the ship route.

In the embodiment of the present disclosure, based on meteorological environment data of the inland waters (i.e., the airflow, etc.), the processor may combine a multi-objective decision making (i.e., balance the risk value and the navigation time of the route segment), an intelligent algorithm (that is, the sparrow search algorithm) and an geographic information technology (e.g., the following route segment feature) to provide a way to determine the optimal ship route when performing tasks, which further improves the safety of the navigation.

In some embodiments, the coefficient of the influence level of wave height on the navigation risk of the ship and the coefficient of the influence level of the wind speed on the navigation risk of the ship in the ship route risk assessment function may be related to a ship feature and a current cumulative navigation feature.

The ship feature may be a state index of the ship during navigation. In some embodiments, the ship feature may include a mass, a volume, a dead weight capacity, and a fuel load of the ship. The mass of the ship may be the total mass of the ship when it is empty, the volume of the ship may be a space occupied by the ship when it is in the water, the dead weight capacity of the ship may be the maximum mass that the ship is allowed to load when it reaches the maximum displacement, and the fuel load may be the maximum amount of oil that the ship is allowed to carry when it is fully loaded.

In some embodiments, the processor may obtain the ship feature in various ways. Exemplarily, the processor may retrieve the ship feature of the ship from a database based on a ship identification. The ship feature may further be determined by obtaining a user input.

The cumulative navigation feature may be an indicator of the ship related to the navigation in the historical navigation, which may reflect a consumption of the ship during the navigation. In some embodiments, the current cumulative navigation feature may include a navigated distance and a navigated time of the ship from the start of the navigation to the current moment. In some embodiments, the processor may obtain the cumulative navigation feature in various ways, such as collecting the current cumulative navigation feature through a sensor, or obtain the current cumulative navigation feature of the ship through table checking.

In some embodiments, the processor may determine a fuel consumption of the ship according to the accumulative navigation feature. For example, the processor may determine the fuel consumption based on the navigated distance of the ship according to a historical navigation experience.

Due to different ship features and different drafts, the influence levels of the wave height and wind speed on the ship navigation risk may be different. For example, for ships with the same ship features, the deeper the draft, the lower the influence levels of the wave height and the wind speed on the ship navigation risk. For ships with the same draft, the smaller the volume of the ship, the greater the impact of wave height and wind speed on the ship navigation risk.

In some embodiments, the processor may convert the cumulative navigation feature to obtain the fuel consumption of the ship, so as to determine the current draft of the ship, and then determine the coefficients of the influence levels of the wave height and the wind speed on the ship navigation risk according to the current draft of the ship and the ship feature. For example, based on a preset table constructed from historical data, the processor may retrieve the coefficients of the influence levels of the wave height and the wind speed on the ship according to the current draft and the ship feature.

In the embodiment of the present disclosure, the current draft of the ship may be determined based on the cumulative navigation feature, and the influence levels of the wave height and the wind speed on the ship navigation risk may be corrected by using the ship feature and the and the current draft. As a result, the ship navigation risk may be obtained more accurately thereby further guarantee the safety of the ship navigation.

In some embodiments, the ship route risk assessment function further includes an out-of-control collision risk item used to assess the probability that the ship loses control and collides with the obstacles in the surrounding grids in any route segment.

In some embodiments, the out-of-control collision risk item may be the probability of a ship colliding due to out-of-control when the ship is navigating on different routes.

In some embodiments, the out-of-control collision risk item may at least be related to the ship feature and a route segment feature of the corresponding route segment. For example, the route segment feature may include a distribution of obstacles around the route segment, a strength of a magnetic field, a visibility of a sea surface, etc.

In some embodiments, the processor may determine the out-of-control collision risk item of the ship in the route segment based on the ship feature and the route segment feature of the corresponding route segment. Exemplarily, the processor may determine the out-of-control collision risk item of the route segment by using the ship feature and the route segment feature based on the historical navigation data or through the table-checking.

In some embodiments, the processor may improve the ship route risk assessment function based on the out-of-control collision risk item, so that the risk value in the ship route may be predicted more accurately, and the ship route planning may be further optimized to avoid collisions caused by the out-of-control of the ship. As an example only, the calculation formula of the improved ship route risk assessment function is as follows:

$$f_{C,risk} = \frac{1}{Q}\sum_{i=1}^{Q}\left(\alpha_C \times \frac{H_{C,i,wave}}{H_{C,max,wave}} + \beta_C \times \frac{V_{C,i,wind}}{V_{C,max,wind}} + R_i\right) \quad (9)$$

where, $R_i$ indicates the out-of-control collision risk item of the ith route segment, and $f_{C,risk}$ indicates the risk value in the improved ship route based on the out-of-control collision risk item. For the specific implementation of other parameters in the formula (9), please refer to the above formula (8) and the related descriptions.

In the embodiment of the present disclosure, the processor may predict the risk of the ship encountering the obstacle due to loss of control in the route segment based on various parameters such as the ship feature and the route segment feature of the corresponding route segment, so as to more accurately obtain the risk value in the ship route, and further improves the safety of the ship route planning.

In some embodiments, the out-of-control collision risk may be determined based on an out-of-control collision risk prediction model. In some embodiments, the out-of-control collision risk prediction model may be a machine learning model, for example, a recurrent neural network (RNN), etc.

Figure 7:
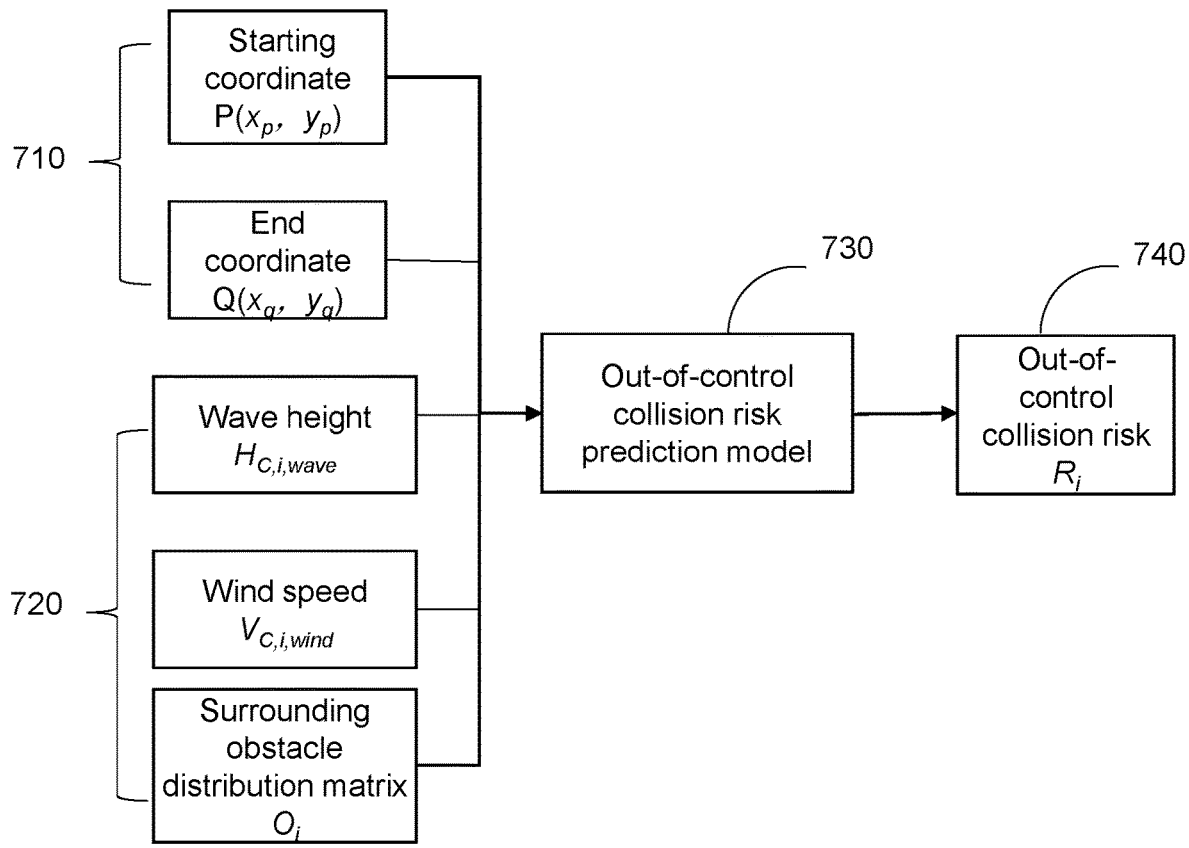
FIG. 7 is a schematic diagram illustrating an out-of-control collision risk prediction model according to some embodiments of the present disclosure.

In some embodiments, as shown in FIG. 7, the processor may input a ship feature 710 and a route feature 720 of the route segment to an out-of-control collision risk prediction model 730 to obtain an out-of-control collision risk 740 of the route segment. As shown in FIG. 7, the ship feature 710 may include a starting coordinate and an end coordinate of any route segment i in the ship route. Correspondingly, the route feature 720 of the route segment may include a wave height, a wind speed, a surrounding obstacle distribution, etc. of the route segment i in the ship route. For more descriptions of the ship feature 710 and the route feature 720 of the route segment, please refer to the aforementioned related descriptions.

Exemplarily, as shown in FIG. 7, the processor may input the starting coordinate P ($x_p$, $y_p$) and the end coordinate Q ($x_q$, $y_q$) of the ith route segment in the ship route, the wave height $H_{C,i,wave}$ of the route section and the wind speed $V_{C,i,wind}$ of the ith route segment in the ship route, a surrounding obstacle distribution matrix Oi of the ith route segment to the out-of-control collision risk prediction model 730, and based on the process of the out-of-control collision risk prediction model 730, output the out-of-control risk $R_i$ of the ith route segment.

The surrounding obstacle distribution matrix Oi may include the coordinates of a plurality of obstacles, and an exemplary distribution matrix is as follows:

$$O_i = \begin{bmatrix} x_1 & y_1 & z_1 \\ x_2 & y_2 & z_2 \\ \vdots & \vdots & \vdots \\ x_n & y_n & z_n \end{bmatrix} \quad (10)$$

where, each horizontal row of the surrounding obstacle distribution matrix $O_i$ may be a 3D coordinate of an obstacle in the ith route segment.

In some embodiments, the processor may obtain the starting coordinate P ($x_p$, $y_p$) and the end coordinate Q ($x_q$, $i_s$) of the ith route segment, the wave height $H_{C,i,wave}$ of the ith route segment in the ship route, the wind speed $V_{C,i,wind}$ of the ith route segment in the ship route, and the surrounding obstacle distribution matrix Oi of the ith route segment corresponding to the ship through various modes, such as a sensor collection or a communication with the positioning device.

In some embodiments, the out-of-control collision risk prediction model may be trained based on a great number of labeled training samples. In some embodiments, the training samples may be a plurality of ship feature samples and route feature samples of route segments, and the training samples may be obtained by calling ship features and route features of route segments in historical route planning in the database. In some embodiments, the label may be out-of-control collision risk sample of the route segment, and the label may be obtained by calling the historical out-of-control collision risk corresponding to the route segment, or by manually labeling the route segment. Exemplarily, the historical out-of-control collision risk may be determined according to a ratio of a number of ship collisions occurring in the history of the route segment to a total number of passing times of the ship.

In S130, calculating, based on the sparrow search algorithm, the flying distance of the sparrow and the corresponding fitness value.

In some embodiments, the flying distance of the sparrow may be used to reflect a length of the ship route, and the fitness value may be used to reflect the navigation ability of the ship. For the specific implementation mode of the flying distance and the fitness value, please refer to the aforementioned formula (2) and the related descriptions.

In S140, substituting the flying distance into the navigation time optimization target function, substituting the fitness value into the ship route risk assessment function, generating a sparrow total cost assessment function (that is, the ship total cost assessment function), and determining the minimum value of the sparrow total cost assessment function.

In some embodiments, by defining the ship route planning problem as a series of optimization criteria and constraints, balancing the navigation time and the ship route risk, a total value of the navigation time optimization target function and the ship route risk assessment function is minimized, thereby generating the ship total cost assessment function. In some embodiments, the processor may obtain the ship total cost assessment function through the navigation time optimization target function and the ship route risk assessment function, and the ship total cost assessment function is expressed in formula (11):

$$J_{C,cost} = T_1 J_{TC} + T_2 r_{C,risk} \qquad (11)$$

where, $J_{C,cost}$ indicates the ship total cost assessment function; $T_1$ indicates a weight parameter of the navigation time optimization target function $J_{TC}$, and $T_2$ indicates the weight parameter of the ship route risk assessment function $r_{C,risk}$. In some embodiments, the weight coefficient needs to satisfy the following conditions: $T_1 \geq 0$, $T_2 \geq 0$, $T_1 + T_2 = 1$.

In S150, determining a sparrow flying route corresponding to the minimum value as an optimal ship route.

In some embodiments, the navigation time optimization target function may be used to assess the navigation time of the ship on the ship route, the ship route risk assessment function may be used to assess the risk value of the ship navigating on the route, and the sparrow total cost assessment function may be used to assess an overall state of the flying route of the sparrow (i.e., the ship route) to select an appropriate ship route. The smaller the value of the sparrow total cost assessment function, the more balanced the risk value and the navigation time of the ship route.

In the embodiment of the present disclosure, the processor may obtain the ship total cost assessment function by mathematically modeling the minimum navigation time optimization target function and the ship risk assessment function, so that the problem is transformed into an optimization of the total cost assessment function. The processor may use the improved sparrow search algorithm to construct a solution idea corresponding to the optimization of the cost assessment function, and execute an optimization process on the sparrow search algorithm, thereby implementing the optimization of the planned route of the emergency rescue ship.

As the environment in the water area may change, in some embodiments, the processor may selectively execute the following operations S160-S170.

In S160, forming a navigation dispatching instruction based on the optimal ship route.

The navigation dispatching instruction may be an instruction to guide the movement of the ship. In an ideal state, the ship may navigate completely in accordance with the navigation dispatching instruction, so that the ship may navigate on the optimal ship route. In some embodiments, there may be multiple forms of the navigation dispatching instruction, such as a text, a voice, an image, etc. In some embodiments, the navigation dispatching instruction may include a navigation direction, a navigation speed, etc. that the ship is expected to reach.

In some embodiments, the processor may obtain the navigation dispatching instruction corresponding to the optimal ship route based on various modes such as the historical data or the table checking. For example, based on the optimal ship route, the processor may retrieve historical navigation data with similar ship routes (e.g., a historical navigation direction, a historical navigation speed, etc.), and generate the corresponding navigation dispatching instruction.

In S170, guiding the ship to navigate at least based on the navigation dispatching instruction and an environmental assessment result obtained from a preset environmental assessment period.

As the state of the actual water area is complex and changeable, and an environmental feature (such as the obstacles in the route segment, etc.) are prone to errors, in some embodiments, the preset environmental assessment period may be used to guide a time or frequency of the environmental assessment.

In some embodiments, the environmental assessment period may be determined based on an actual environmental feature and a computing power allocation of at least one navigation sub-task. The navigation sub-task includes at least one of a navigation parameter dispatching, a navigation parameter risk warning, and the environmental assessment. The computing power distribution of the navigation sub-task may be set based on the processor. Exemplarily, the greater the number of current obstacles corresponding to the current position of the ship, the closer the distribution of the obstacles, the greater a variance of the wave height, the greater the variance of the wind speed, and the higher the computing power allocated by the processor to the environmental assessment task, the shorter the environmental assessment period.

In some embodiments, the environmental assessment result may include whether to replan the ship route, and the environmental assessment result may be determined based on an environmental feature difference corresponding to the ship. The environmental feature difference is the difference between the actual environmental feature of the ship and the planned environmental feature. The environmental feature difference may be determined based on a vector distance after vectorizing the actual environment feature and the planned environment features, respectively. For example, the smaller the vector distance, the smaller the difference of the environmental feature difference. The vector distance may be a cosine distance, etc.

The actual environment ship feature may be the features of the navigation environment assessed in real time. The planned environment feature may be the feature of the navigation environment planned in a previous stage. In some embodiments, the actual environment feature may be obtained by the processor through a sensor collection or a communication with the positioning device, and the planned environment feature may be obtained by the processor through modes like calling the database.

In some embodiments, the processor may determine whether the replanning is required based on whether the navigation environment feature within a preset range of the current position is consistent with the navigation environment feature in the previous planning. If the difference is great (e.g., greater than a preset difference threshold), the processor may perform the route planning again.

The preset range may be a water area centered on the current position and a preset radius from the current position. Exemplarily, the navigation environment feature within the preset range may include a number of obstacles, an obstacle distribution (the distance between each obstacle and the current position of the ship), a wave height feature (a real-time value, a mean value, and the variance of the wave height), a wind speed stability (the real-time value, the mean value, and the variance of the wind speed). Correspondingly, the processor may monitor the wave height in real time through a wave height monitoring device, and assess the mean value and the variance of the wave height based on the wave heights at multiple moments. Similarly, the processor may monitor the wind speed in real time through a wind speed monitoring device, and assess the mean value and the variance of the wind speed based on the wind speeds at multiple moments. If the navigation environment features within the preset range of the current position are quite different from the navigation environment features in the previous planning, the processor may correct the ship route and guide the ship navigation.

In some embodiments, the processor may replan the ship route in various ways. For example, with the current location as the starting point, and based on the current navigation environment features, the ship route planning mode in operations S110-S150 may be executed again to replan the ship route.

In the embodiment of the present disclosure, the processor may assess changes in the environmental feature within a preset environmental assessment period, and then correct the ship route based on the environment with great changes, so as to avoid accidents during the navigation, thereby improving the navigation safety.

In order to prevent the update of the sparrow's position at the later stage of the iteration from falling into a local optimum, in some embodiments, the processor may apply the improved sparrow search algorithm to the process of planning the optimized route, and determine an optimal route of the ship navigation through a termination condition.

In some embodiments, an adaptive t distribution variation strategy:

$$\dot{X}_{y,j}^* = \dot{X}_{y,j} + \dot{X}_{y,j} \times t(M) \quad (12)$$

$$\ddot{X}_{z,j}^* = \ddot{X}_{z,j} + \ddot{X}_{z,j} \times t(M) \quad (13)$$

$$\dddot{X}_{k,j}^* = \dddot{X}_{k,j} + \dddot{X}_{k,j} \times t(M) \quad (14)$$

where, t(M) indicates a t distribution with a iteration number S as a freedom level; $\dot{X}_{y,j}^*$ indicates the position occupied by the yth discoverer in the jth dimension after the variation; $\dot{X}_{y,j}$ indicates the position occupied by the yth discoverer in the jth dimension; $\ddot{X}_{z,j}^*$ indicates the position occupied by the zth follower in the jth dimension after the variation, and indicates the position occupied by the zth follower in the jth dimension; $\dddot{X}_{k,j}^*$ indicates the position occupied by the kth vigilante in the jth dimension after the variation, and $\dddot{X}_{k,j}$ indicates the position occupied by the kth vigilante in the jth dimension.

Figure 2:
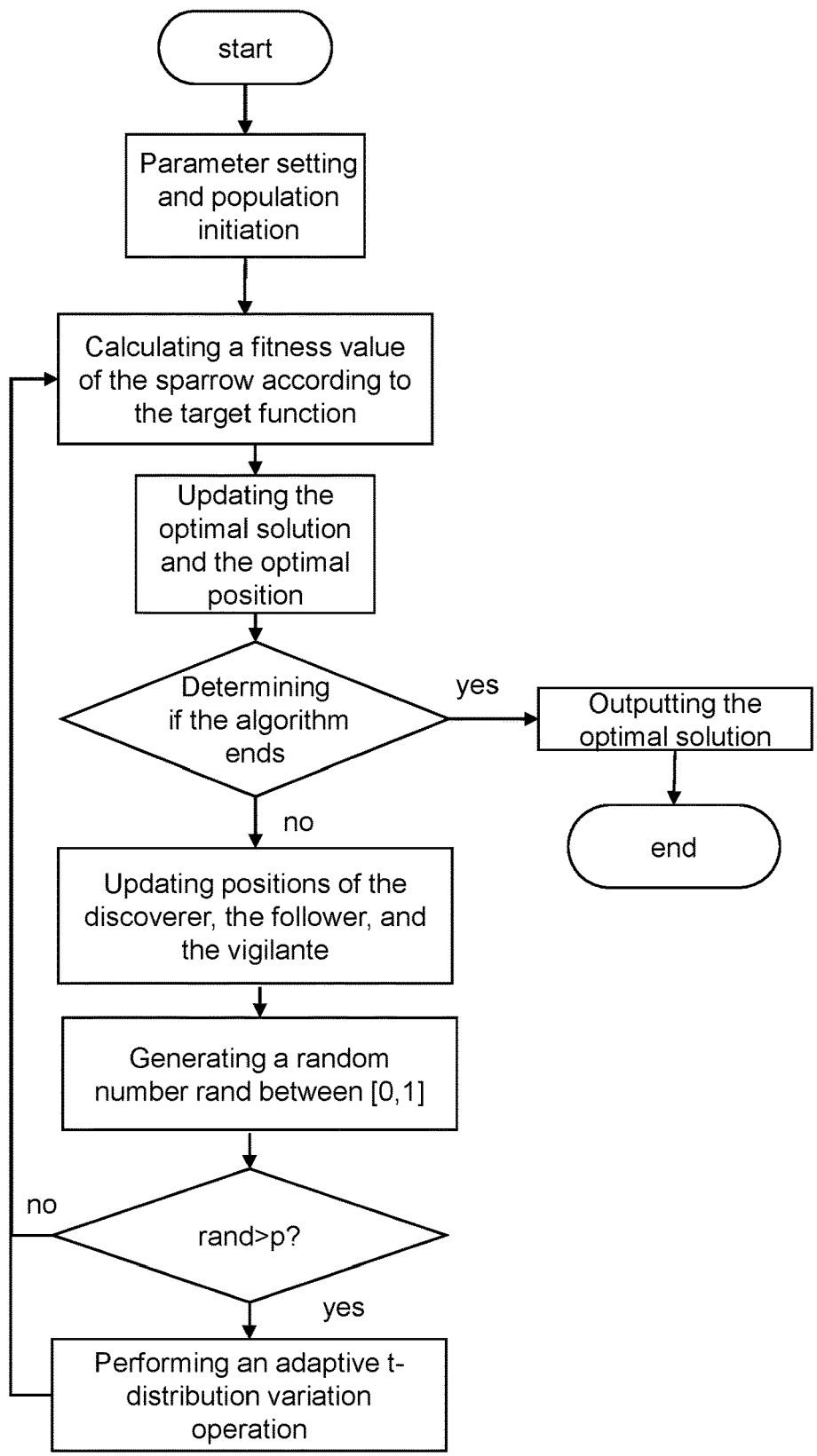
FIG. 2 is a flow chart illustrating an improved sparrow search algorithm according to some embodiments of the present disclosure.

In the embodiment of the present disclosure, the processor may use the features of fast convergence speed and strong global ability of the sparrow search algorithm to further improve the optimization performance of the sparrow search algorithm and prevent the algorithm from falling into the local optimum in the later stage of iteration, making the algorithm more suitable. As a result, the algorithm may be more suitable for actual ship navigation conditions, with high efficiency and strong reliability, and may meet the needs of the ship route optimization under extreme conditions. For specific algorithm process for optimizing the positions of sparrow individuals adopting the adaptive t-distribution mutation strategy, please refer to FIG. 2.

In order to better illustrate the ship route optimization method in the embodiment of the present disclosure, this embodiment provides a specific implementation process for the processor to determine the ship route of the rescue ship, including the following operations.

Operation 1, parameter initialization. The processor may initialize required parameters. The initialization of the required parameters may include one or more settings, such as the setting of the maximum number of iterations, the setting of the safety threshold in the sparrow search algorithm, the weight in the ship total cost assessment function of the ship navigation, and a ship maximum turning angle, etc.

Operation 2, population initialization. In some embodiments, the processor may set proportions of different types of sparrows in the sparrow population. Such as setting the proportions of the discoverers, the followers, and the vigilantes in the population.

Operation 3, ship navigation environment establishment. In some embodiments, the processor may set the positions of the starting point and the rescue point of the emergency rescue ship, as well as the position of the high-risk area, and record current ship navigation environment information.

Step 4, candidate route determination. In some embodiments, the processor may use the adaptive t distribution variation strategy proposed in this embodiment to optimize the position of the sparrow individual, and then use the improved sparrow search algorithm to optimize and update the ship total cost assessment function, and determine the candidate route through ship navigation waypoints.

In some embodiments, the processor may update the current position of the individual sparrow based on the corresponding relationship of each type of sparrow (the discoverer, the follower, the vigilante). For example, by updating the positions of the discoverers based on a discoverer position calculation formula, determining current positions of the discovers. For the specific implementation of the updated position, please refer to the above formula (3)-formula (5) and the related descriptions.

In some embodiments, the candidate route may include the route between the current position and the initial position. Correspondingly, the processor may determine the route between the updated current position and the initial position based on the updated current position.

Operation 5, route update. In some embodiments, the processor may respectively compare the updated current positions of the discoverer, the follower, and the vigilante with their corresponding initial positions.

Exemplarily, in response to that the route between the current position and the initial position (that is, the current route) is shorter than the route between the position before updating and the initial position (that is, the previous route), the processor records the current position as the final position, and the processor may construct a new route output as the optimal ship route. In response to that the routes between the current positions and the initial positions are not shorter than the routes between the positions before the update and the initial positions, the processor records the positions before the update as the final positions, so as to determine the final positions of the discoverer, the follower, and the vigilante respectively.

Operation 6, determining whether to continue the iteration. The processor may determine whether the termination condition is reached, and if not, go to Operation 4; Otherwise, the processor may output the optimal ship route.

In some embodiments, the termination condition may include: the sparrow total cost assessment function converges or reaches the maximum number of iterations. In some embodiments, when the sparrow total cost assessment function converges or reaches the maximum number of iterations, the processor may obtain the minimum cost value in this route optimization. That is to say, when the iteration stops, the processor may find out the discoverer, the follower or the vigilante who has the shortest distance from the current position to the initial position, determine the corresponding fitness value, and then obtain the target sparrow that makes the sparrow total cost assessment function take the minimum value (that is, the minimum cost value). The flying route corresponding to the target sparrow is the optimal ship route.

In some embodiments, the processor may determine the flying time based on the flying distance of the sparrow, bring the flying time into the navigation time optimization target function of the ship for calculation, and obtain the flying time optimization target function of the sparrow. The processor may determine the navigation risk based on the fitness value of the sparrow. The navigation risk is the coefficient indicating the influence level of the flying height of the sparrow on the flying risk and the coefficient indicating the influence level of the wind speed on the flying risk. The two coefficients may be substituted into the ship route risk assessment function to obtain the sparrow route risk assessment function. The processor may further combine the flying time optimization target function of the sparrow and the sparrow route risk assessment function to form the sparrow total cost assessment function, and determine the cost value corresponding to the iteration. The cost value is the value of the sparrow total cost assessment function in the iteration.

In the embodiment of the present disclosure, by considering the dynamic feature of the multi-functional emergency rescue ship and the interference effect caused by the airflow, a movement model with kinematics non-holonomic constraints (such as the ship total cost assessment function according to the aforementioned formula (11)) is used to simulate the movement of the ship, and by learning how to apply the algorithm to the route planning of the emergency rescue ship based on a sparrow search algorithm, the ship route optimization algorithm may be improved. Moreover, after the aforementioned improvement, the accuracy and practical applicability of the route planning calculation may be greatly improved, and the accurate positioning of the obstacles and hidden reefs may be effectively performed. Further, considering the effects of the airflow and the non-holonomic constraints, the route planning of the ships may be more efficient and intelligent.

Figure 6:
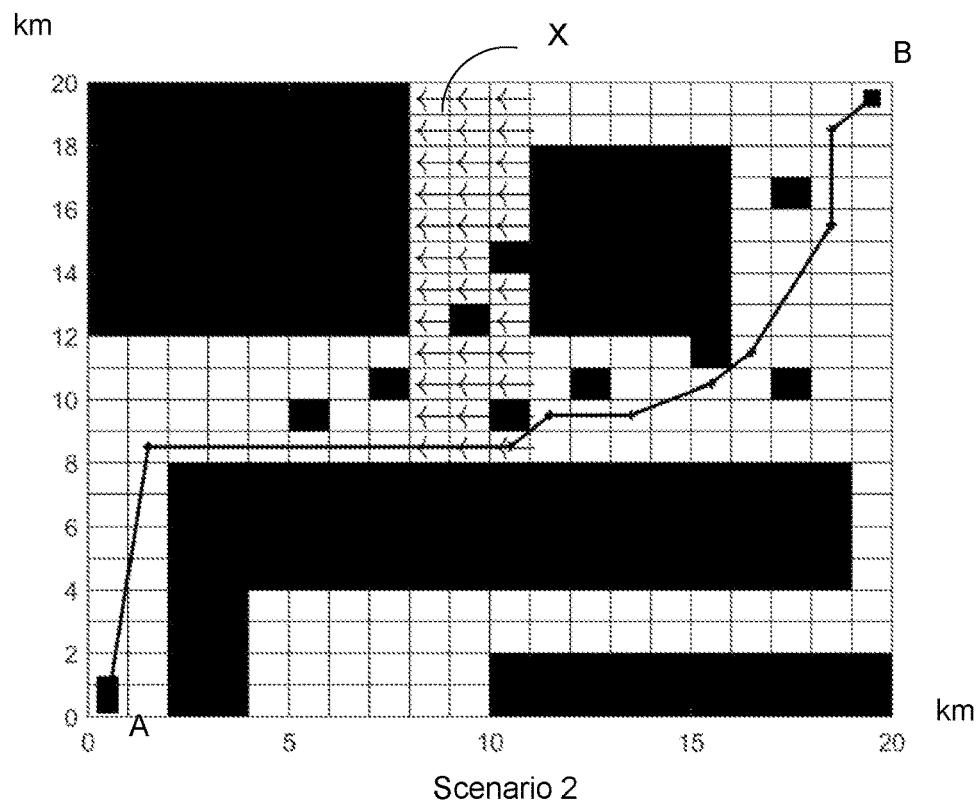
FIG. 6 is a schematic diagram illustrating the shortest route of the ship in scenario 2 according to some embodiments of the present disclosure.

Exemplary simulation experiments may be performed based on the above process. The simulation environment of this experiment mode runs in MATLAB 2021a on a computer with 11th Gen Intel® Core™ i7-11800H @ 2.30 GHz2.30 GHz and 16 GB memory. A ship navigation grid map may be established, and the high-risk area may be set as shown in FIG. 3 and FIG. 6, where the arrow areas are the high-risk areas, and the starting point [1,1] and the rescue point [20,20] of the rescue ship may be set. Impassable areas such as static obstacles are indicated by black grids, free passage areas are indicated by white grids, and the gray grid areas are high-risk areas. The population may be initialized, and the parameters may be changed. For example, the maximum number of iterations may be set to 200, and the maximum turning angle of the ship may be set to 45 degrees. In the risk area, the influence level coefficient=0.6, =0.4, the population size may be 50, the discoverer ratio may be 0.3, the vigilante number may be 5, the mutation probability P=0.5, the grid size may be 20 km*20 km.

Figure 5:
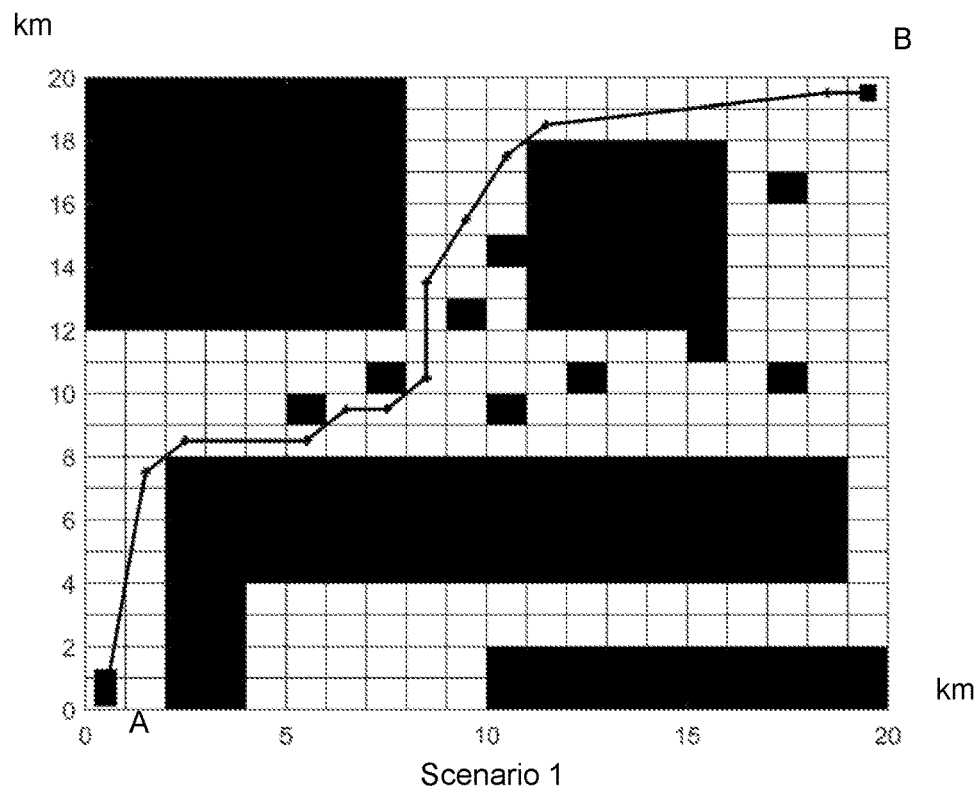
FIG. 5 is a schematic diagram illustrating the shortest route of a ship in scenario 1 according to some embodiments of the present disclosure.

First of all, the embodiments of the present disclosure have tested and verified an effectiveness of the sparrow search algorithm for the ship route planning problem, and the verification is carried out from two scenarios respectively. The two scenarios may include Scenario 1 as shown in FIG. 5 and Scenario 2 as shown in FIG. 6. The difference between the Scenario 2 and the Scenario 1 is that a high-risk area is set in Scenario 2.

In the Scenario 1, a grid map of ship navigation is established with a grid size of 20 km*20 km. The impassable areas such as the static obstacles are indicated by the black grids, and the free passage areas are indicated by the white grids. The starting point A[1,1] and the target point B[20,20] of the emergency rescue ship are set, and an orientation is 0 degree. In order to verify the intelligence and applicability of the algorithm, a risk assessment function may be used and the risk influence level coefficient may be set as 0.6, 0.4, the weight parameter of the navigation time optimization target function of the ship may be set as 0.7, and the weight parameter of the ship route risk assessment function may be set as 0.3.

The difference between the Scenario 2 and the Scenario 1 is that the rectangular grid area formed by [8,8] and [11,20] in the Scenario 2 (that is, the arrow area X) is used as the high-risk area.

FIG. 5 is a route planning of the ship in an obstacle environment corresponding to the Scenario 1. It can be seen that the planned route is a continuous shortest curve, while FIG. 6 is the ship route corresponding to the Scene 2. It can be seen that the ship avoids the high-risk area X, and a shortest continuous route in the high-risk environment is planned. It can be seen that the route planned in the Scenario 2 considering the risk area may stay away from the high-risk area X and ensure that the ship does not pass through the high-risk area X during the rescue process and cause unnecessary losses, which not only improves the rescue efficiency of the ship, but also ensures the safety of the ship.

Figure 8:
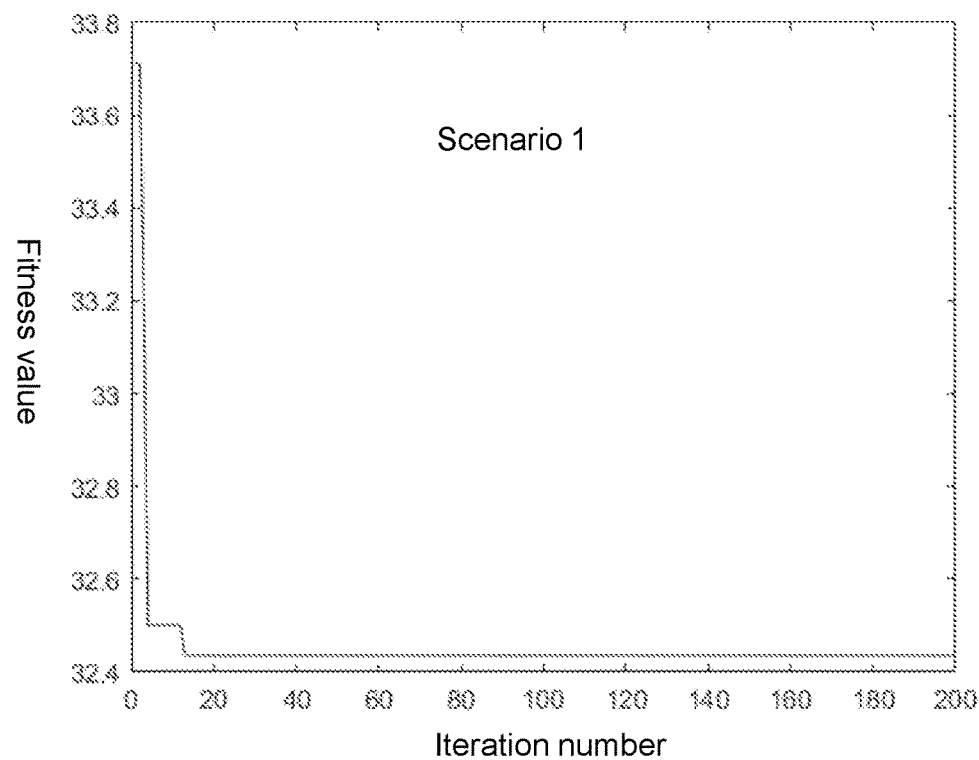
FIG. 8 is a schematic diagram illustrating a fitness change curve in scenario 1 according to some embodiments of the present disclosure.
Figure 9:
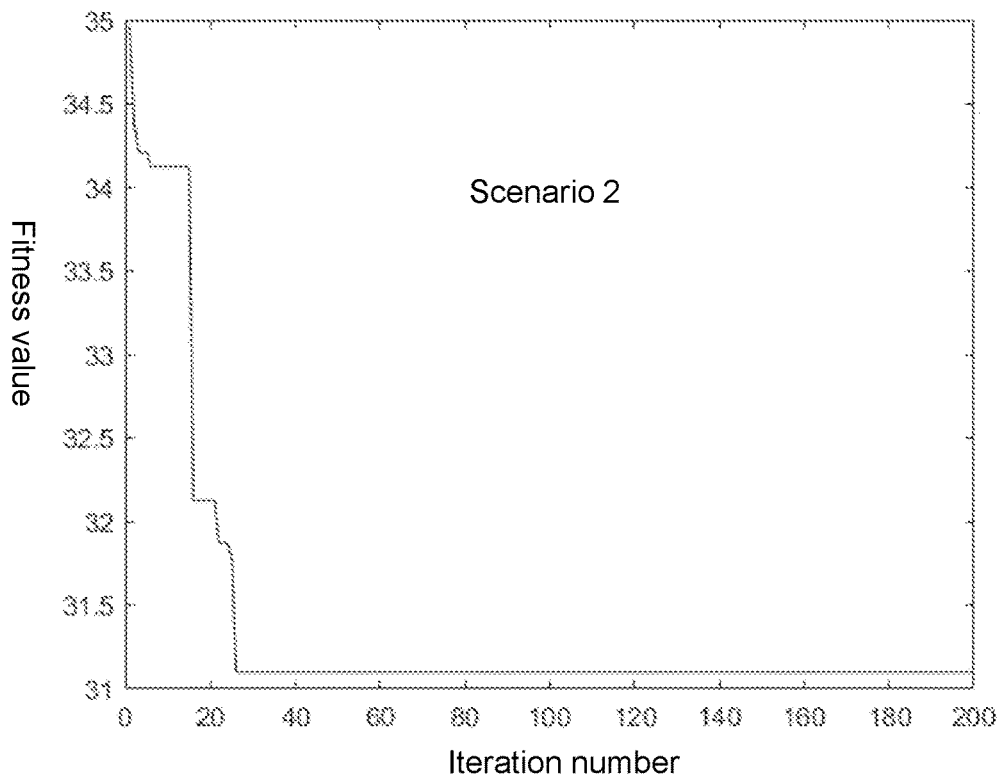
FIG. 9 is a schematic diagram illustrating the fitness change curve in scenario 2 according to some embodiments of the present disclosure.

FIGS. 5-6 show a rationalized route planned for the rescue ships based on the improved sparrow search algorithm. It can be seen that the algorithm may help to avoid obstacles and complete the shortest route planning task, and may also avoid the high-risk areas, which ensure that the ship can navigate safely to the purpose. FIGS. 8-9 show that the algorithm has converged after about 20 iterations in the Scenario 1 and the Scenario 2. From a perspective of convergence speed, the sparrow search algorithm is an effective optimization method for the ship route planning. The sparrow search algorithm based on the adaptive t distribution variation strategy provides the ability to balance a universal search and a local development, has a good performance in the route planning of the rescue ships, and further provides a reasonable reference for the universal ship route of the ships in a real complex environment.

Below, an electronic device used in the embodiment of the present disclosure is described with reference to FIG. 10; The electronic device may be the mobile device itself, or a stand-alone device independent from the mobile device. The stand-alone device may communicate with the mobile device and an ultrasonic medical device to receive input signals collected by the mobile device and the ultrasonic medical device, and send a selected target decision-making behavior to the mobile device and the ultrasonic medical device.

Figure 10:
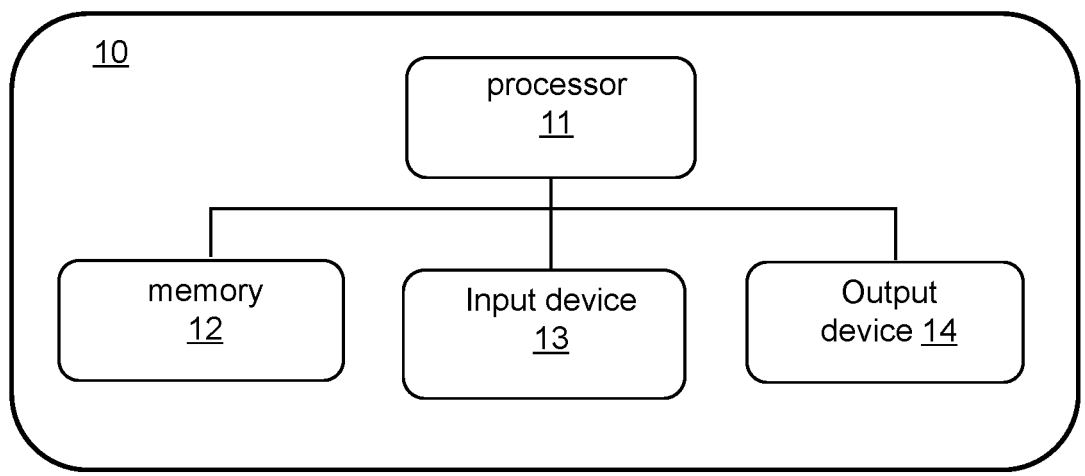
FIG. 10 is a schematic diagram illustrating a frame of an electronic device according to some embodiments of the present disclosure.

As shown in FIG. 10, an electronic device 10 includes one or more processors 11 and corresponding memories 12.

The processor 11 may be a central processing unit or other forms of processing units with data processing capabilities and/or instruction execution capabilities, and may control other components in the electronic device 10 to perform required functions. The memory 12 may include one or more computer program products, which may include various forms of computer storage media, such as a volatile memory and/or a nonvolatile memory. The volatile memory may include, for example, a random access memory (RAM) and/or a cache memory (cache), etc. The non-volatile memory may include, for example, a read-only memory (ROM), a hard disk, a flash memory, etc. One or more computer program instructions may be stored on the computer storage medium, and the processor 11 may execute the program instructions to realize the above-mentioned decision-making behavior, decision-making modes and/or other expected functions of various embodiments of the present disclosure.

In some embodiments, the electronic device 10 may further include: an input device 13 and an output device 14, and these components are interconnected through a bus system and/or other forms of connection mechanisms (not shown). For example, the input device 13 may also include, for example, a keyboard, a mouse, etc. The output device 14 may include, for example, a display, a speaker, a printer, a communication network, and its connected remote output devices, etc.

Of course, for the sake of simplification, only some components in the electronic device 10 related to the present disclosure are shown in FIG. 10, and components such as the bus, the input/output interface, etc. are omitted. In addition, according to specific application conditions, the electronic device 10 may also include any other suitable components.

Figure 11:
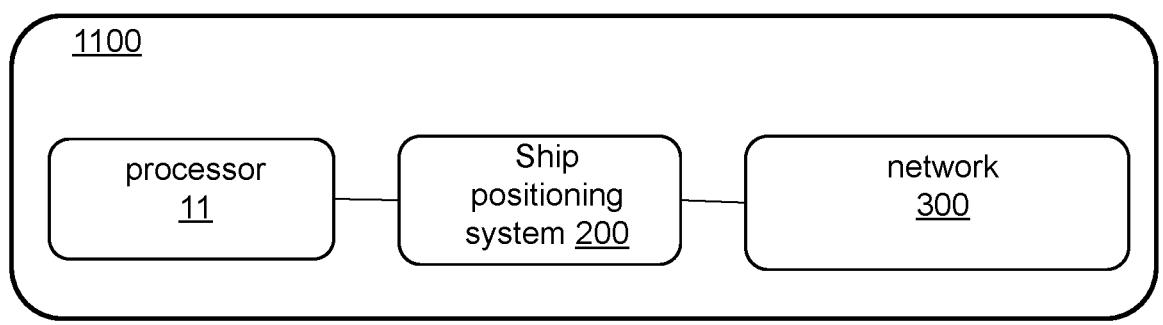
FIG. 11 is a schematic diagram illustrating a device for a ship route optimization according to some embodiments of the present disclosure. Labels: 10. Electronic device; 11. Processor; 12. Memory; 13. Input device; 14. Output device; 1100. Device for ship route optimization; 200. Ship positioning system; 300. Network.

In some embodiments, as shown in FIG. 11, a ship route optimization device 1100 may include the processor 11 and a ship positioning system 200. The ship positioning system 200 is deployed on a ship or a shore base, and is configured to determine the position of the ship based on one or more measured distances between the ship and satellites.

The processor 11 may be an electronic device that processes data obtained from other devices and/or regulates other devices. In some embodiments, the processor 11 may be an application specific integrated circuit (ASIC) or a field-programmable gate array (FPGA). In some embodiments, the processor 11 may perform a data transmission with the ship positioning system. For example, the ship positioning system 200 may transmit the position of the ship to the FPGA through the data bus. In some embodiments, the processor 11 may call the algorithm from the memory and execute the above-mentioned ship route optimization method, and the specific implementation may be referred to in the above-mentioned FIG. 1-FIG. 10 and the related descriptions.

In some embodiments, the ship positioning system 200 may include a GPS positioning information receiving system, a remote sensing, a position sensor, a distance sensor, a direction sensor, etc. In some embodiments, the position of the ship may be represented in various forms, such as a combination of an area name and a grid number, coordinate values, etc.

In some embodiments, the ship route optimization device 1100 may further include a network 300, which may be used to provide a communication channel between the processor 11 and other devices (such as the ship positioning system 200, a user terminal, etc.). In some embodiments, the network 300 may be any one or more of a wired network or a wireless network. The user terminal refers to an electronic device used by a user, and may include various mobile devices, smart devices, wearable devices, etc., for example, a mobile phone, a smart watch, etc.

In addition to the above-mentioned methods and devices, the embodiments of the present disclosure may further be extended to computer program products, which include computer program instructions that, when executed by a processor, cause the processor to perform the operations in the decision-making behavior and decision-making method according to various embodiments of the present disclosure described in the above "exemplary methods" of the present disclosure.

The computer program product may be written in any combination of one or more programming languages to execute program codes for performing the operations of the embodiments of the present disclosure. The programming languages include object-oriented programming languages, such as Java, C++, etc., as well as conventional procedural programming languages, such as the "C" language or similar programming languages. The program code may be executed entirely on the user's computing device, partly on the user's device, as a stand-alone software package, partly on the user's computing device and partly on a remote computing device, or executed entirely on the remote computing device or server.

In addition, the embodiments of the present disclosure may further be a readable computer storage medium, on which the computer program instructions are stored, and when the computer program instructions are executed by a processor, the processor executes the operations of the decision-making behavior and decision-making method according to various embodiments of the present disclosure described in the above "detailed description" part of the present disclosure.

The computer storage medium may utilize any combination of one or more readable media. The readable medium may be a readable signal medium or a storage medium. The storage medium may include, but not limited to, electrical, magnetic, optical, electromagnetic, infrared, or semiconductor systems, devices, or equipment, or any combination thereof. More specific examples (non-exhaustive list) of the storage medium may include: an electrical connection with one or more conductors, a portable disk, a hard disk, a random access memory (RAM), a personal read memory (ROM), an erasable programmable read memory (EPROM or a flash memory), a fiber optics, a portable compact disk read memory (CD-ROM), an optical storage device, a magnetic storage device, or any suitable combination of the above.

Of course, for those skilled in the art, the present disclosure is not limited to the details of the above exemplary embodiments, and the present disclosure may be implemented in other specific forms without departing from the spirit or essential features of the present disclosure. Therefore, the embodiments should be regarded as exemplary and not restrictive in all points of view, and the scope of the present disclosure is defined by the appended claims rather than the foregoing description, and it is intended that the scope of the present disclosure may be defined by the appended claims rather than by the foregoing description. All changes within the meaning and range of equivalents conditions are embraced in the present disclosure. Any reference sign in a claim should not be construed as limiting the claim concerned.

In addition, it should be understood that although the present disclosure is described according to implementation modes, not each implementation mode only contains an independent technical solution, and the description in the present disclosure is only for clarity, and those skilled in the art should take the present disclosure as a whole. The technical solutions in the various embodiments may further be properly combined to form other implementations that can be understood by those skilled in the art.

Technologies not described in detail in the present disclosure are known technologies.

What is claimed is:

1. A method for ship route optimization performed based on a processor, the method comprising:
    S1, controlling a ship positioning system to obtain positioning data of a ship in real time; in response to receiving a route optimization requirement, constructing, based on the positioning data obtained from the ship positioning system, a navigation environment where the ship navigates; setting a navigation condition of the ship in the navigation environment; and adding a risk area that poses a risk of interference to the ship in the navigation environment;
    S2, determining a ship route of the ship, and establishing a navigation time optimization target function and a ship route risk assessment function of the ship in the ship route; wherein the ship route is generated based on the navigation environment; and the navigation time optimization target function takes a navigation time as a variable, and the ship route risk assessment function takes a navigation risk as a variable;
    S3, determining, based on a sparrow search algorithm, a flying distance of a sparrow and a corresponding fitness value;
    S4, substituting the flying distance into the navigation time optimization target function, and the fitness value into the ship route risk assessment function, generating a sparrow total cost assessment function, and determining a minimum value of the sparrow total cost assessment function; and determining a sparrow flying route corresponding to the minimum value as an optimal ship route.

2. The method of claim 1, wherein the navigation condition of the ship includes an obstacle in an inland water, a starting point and a target point of ship navigation; and the operation S1 comprises:
    S11, generating the navigation environment where the ship navigates, wherein, the navigation environment is generated by setting the inland water as a two-dimensional (2D) space where the ship navigates and establishing a 2D coordinate system in the 2D space;
    S12, setting coordinates corresponding to the obstacle in the 2D coordinate system based on a size of the obstacle, a number of obstacles and a position of the obstacle in the inland water; and determining coordinates of the starting point and coordinates of the target point of the ship navigation;
    S13, dividing the inland water with a length X, and a width Y in the 2D coordinate system to generate g×r square areas with a side length of u, then:

$$u = \frac{X}{r} = \frac{Y}{g}$$

where, X indicates the length of the inland water in the 2D coordinate system; Y indicates the width of the inland water in the 2D coordinate system; u indicates the side length of the square area; r indicates a number of square areas in a length direction of the inland water; g indicates a number of the square areas in a width direction of the inland water;

S14, determining an obstacle area and a navigable area, the obstacle area being an area with the obstacle, and the navigable area being an area without the obstacle; determining the risk area and a safe area based on the navigable area; the risk area being an area affected by an airflow, and the safe area being a navigation free area without an effect of the airflow.

3. The method of claim 2, wherein the operation S2 comprises:
    S21, in the navigation environment, determining a ship route based on a distribution of the obstacle area, the safe area, and the risk area;
    S22, taking the navigation time of the ship as the variable, establishing the navigation time optimization target function J Tc of the ship on the ship route, the calculation formula of which is as follows:

$$J_{TC} = \left[1 + \frac{1 - \exp(-0.2 \times T_{C,alarm})}{1 + \exp(-0.2 \times T_{C,alarm})}\right] \times T_{C,total}$$

where, $T_{C,total}$ indicates a total navigation time of the ship navigating along the ship route;
$T_{C,alarm}$ indicates a ship warning time, i.e., a time when the ship navigates in the risk area on the ship route;

S23, taking the navigation risk of the ship in the risk area as the variable, establishing the ship route risk assessment function of the ship on the ship route, the calculation formula of which as follows:

$$r_{C,risk} = \frac{1}{Q}\sum_{i=1}^{Q}\left(\alpha_C \times \frac{H_{C,i,wave}}{H_{C,max,wave}} + \beta_C \times \frac{V_{C,i,wind}}{V_{C,max,wind}}\right)$$

where: $\alpha_C + \beta_C = 1$,
$\alpha_C$ indicates a coefficient of an influence level of a wave height on a ship navigation risk;
$\beta_C$ indicates a coefficient of an influence level of a wind speed on the ship navigation risk;
$r_{C,risk}$ indicates a risk value in the ship route;
Q indicates a number of a total route segments in the ship route;
$H_{C,i,wave}$ indicates a wave height of an i-th route segment in the ship route;
$H_{C,max,wave}$ indicates a maximum wave height in the total route segments of the ship route;
$V_{C,i,wind}$ indicates a wind speed of the i-th route segment in the ship route; and
$V_{C,max,wind}$ indicates a maximum wind speed in the total route segments of the ship route.

4. The method of claim 3, wherein a specific establishment process of the sparrow search algorithm in the operation S3 is as follows:
    S31, constructing a sparrow population containing a predetermined number of sparrows, and transforming the navigation environment into a flying environment corresponding to the sparrows, comprising: dividing the sparrow population into discoverers, followers, and vigilantes according to a predetermined ratio, and searching for food in the navigation environment based on the discoverers, the followers, and the vigilantes;
    establishing a population matrix X formed by n discoverers a, h followers b, and m vigilantes c:

$$X = \begin{bmatrix} a_1^1 & \cdots & a_1^d \\ \vdots & \ddots & \vdots \\ a_n^1 & \cdots & a_n^d \\ b_1^1 & \cdots & b_1^d \\ \vdots & \ddots & \vdots \\ b_h^1 & \cdots & b_h^d \\ c_1^1 & \cdots & c_1^d \\ \vdots & \ddots & \vdots \\ c_m^1 & \cdots & c_m^d \end{bmatrix}$$

where, each line in X indicates all positions of corresponding sparrow individual in a flight in the sparrow population, and indicates a flying route corresponding to the ship route, and each position corresponds to a route segment;

d indicates a dimensionality of a to-be-optimized problem variable, that is, a total number of flying route segments of the sparrow in the flight;

a indicates discoverers, n indicates a number of the discoverers; $a_n^1$ indicates a position of a nth discoverer in a first dimension, that is, an initial position of the discoverer in this flight; $a_n^d$ indicates the position of the n th discoverer in a d th dimension, that is, an end position of the discoverer in this flight;

b indicates followers, h indicates the number of the followers; $b_h^1$ indicates a position of an h th follower in the first dimension, that is, an initial position of the follower in this flight; $b_h^d$ indicates the position of the hth follower in the dth dimension, that is, the end position of the follower in this flight;

c indicates vigilantes, m indicates the number of the vigilantes; $c_m^1$ indicates a position of an mth vigilante in the first dimension, that is, an initial position of the vigilante in this flight; $c_m^d$ indicates the position of the mth vigilante in the dth dimension, that is, the end position of the vigilante in this flight;

S32, for each sparrow, determining a flying distance corresponding to the sparrow according to a position change of the sparrow during the flight;

S33, establishing a fitness value matrix F of the sparrow according to the flying distance of the sparrow as follows:

$$F = \begin{bmatrix} f[a_1^1 \ a_1^2 \ \cdots \ a_1^d] \\ \vdots \\ f[a_n^1 \ a_n^2 \ \cdots \ a_1^d] \\ f[b_1^1 \ b_1^2 \ \cdots \ b_1^d] \\ \vdots \\ f[b_h^1 \ b_h^2 \ \cdots \ b_h^d] \\ f[c_1^1 \ cc_1^2 \ \cdots \ c_1^d] \\ \vdots \\ f[c_m^1 \ c_m^2 \ \cdots \ c_m^d] \end{bmatrix}$$

where, $f[\ ]$ indicates a calculation function of a fitness value of a sparrow, and the $f$ value of each row in F is indicated as the fitness value of the corresponding sparrow in the sparrow population.

5. The method of claim 4, wherein the operation S4 includes:

S41, by updating the positions of the discoverers based on a discoverer position calculation formula, determining current positions of the discoverers;

S42, by updating the positions of the followers based on a follower position calculation formula, determining current positions of the followers;

S43, by updating the positions of the vigilantes based on a vigilante position calculation formula, determining current positions of the vigilantes;

S44, by a termination condition, that is, respectively comparing updated positions of the discoverers, the followers and the vigilantes with their corresponding initial positions, in response to that the routes between the current positions and the initial positions are shorter than the routes between the positions before the update and the initial positions, recording the current positions as final positions;

in response to that the routes between the current positions and the initial positions are not shorter than the routes between the positions before the update and the initial positions, recording the positions before the update as the final positions; and determining the flying distance and the fitness value corresponding to each sparrow based on the final positions;

S45, determining a flying time based on the flying distance of the sparrow, substituting the flying time into the navigation time optimization target function for calculation, and obtaining a flying time optimization target function of the sparrow;

determining the navigation risk based on the sparrow's fitness value, the navigation risk being the coefficient $\alpha_M$ indicating an influence level of a flying height of the sparrow on its flying risk and the coefficient $\beta_M$ indicating an influence level of the wind speed on the flight risk; substituting the two coefficients into the ship route risk assessment function to obtain a sparrow route risk assessment function;

S46, combining the flying time optimization target function and the sparrow route risk assessment function to form a sparrow total cost assessment function, and determining a cost value corresponding to the iteration;

S47, repeating the operations S41 to S46 for multiple iterations until finding out a discoverer, follower or vigilante who has the shortest distance from the current position to the initial position, determining a corresponding fitness value of the discoverer, follower or vigilante, obtaining a target sparrow corresponding to the minimum value of the sparrow total cost assessment function, determining the flying route corresponding to the target sparrow as the optimal ship route.

6. The method of claim 5, wherein the discoverer position calculation formula is as follows:

$$\dot{X}_{y,j}^{s+1} = \begin{cases} \dot{X}_{y,j}^s \cdot \exp\left(-\dfrac{y}{\delta \cdot iter_{max}}\right) & R_2 < ST \\ \dot{X}_{y,j}^s + D*L & R_2 \geq ST \end{cases}$$

where, s indicates a current number of iterations, $s \in (1, iter_{max})$, $iter_{max}$ indicates a maximum number of iterations;

$\dot{X}_{y,j}^s$ indicates a position occupied by a yth discoverer in a jth dimension in a sth iteration;

$\dot{X}_{y,j}^{s+1}$ indicates a position occupied by a yth discoverer in a jth dimension in a (s+1)th iteration;

$y \in (1,n)$, $j \in (1,d)$;

$\delta \in (0,1)$ is a random number;

$R_2$ indicates a warning value;

ST indicates a safety threshold;

D is a normally distributed random number;

L is a one-row d-dimensional unit matrix;

the follower position calculation formula is as follows:

$$\ddot{X}_{z,j}^{s+1} = \begin{cases} Q*\exp\left(-\dfrac{\ddot{X}_{worst,j}^{s} - \ddot{X}_{z,j}^{s}}{z^2}\right) & z > \dfrac{h}{2} \\ \ddot{X}_{best,j}^{s} + |\ddot{X}_{z,j}^{s} - \ddot{X}_{best,j}^{s}|*A^{+}*L & z \leq \dfrac{h}{2} \end{cases}$$

where:

$\ddot{X}_{z,j}^{s+1}$ indicates a position occupied by a zth follower in a jth dimension in the (s+1)th iteration, $z \in (1,h)$;

$\ddot{X}_{z,j}^{s}$ indicates a position occupied by the zth follower in the jth dimension in the sth iteration;

$\ddot{X}_{best,j}^{s}$ indicates optimal positions occupied by all followers in the jth dimension in the sth iteration;

$\ddot{X}_{best,j}^{s}$ indicates worst positions occupied by all followers in the jth dimension in the sth iteration;

$A^{+}$ indicates an one-row d-dimensional matrix with each element being 1 or −1;

the vigilante position calculation formula is as follows $$\dddot{X}_{k,j}^{s+1} = \begin{cases} \dddot{X}_{best,j}^{s} + \mu*|\dddot{X}_{k,j}^{s} - \dddot{X}_{best,j}^{s}| & f_{k,j}^{s} > f_{best,j}^{s} \\ \dddot{X}_{k,j}^{s} + K*\left(\dfrac{|\dddot{X}_{k,j}^{s} - \dddot{X}_{worst,j}^{s}|}{f_{k,j}^{s} - f_{worst,j}^{s} + \varepsilon}\right) & f_{k,j}^{s} \leq f_{best,j}^{s} \end{cases}$$

where:

$\dddot{X}_{k,j}^{s+1}$ indicates a position occupied by a kth vigilante in the jth dimension in the (s+1) iteration, $k \in (1,m)$;

$\dddot{X}_{k,j}^{s}$ indicates a position occupied by the kth vigilante in the jth dimension in the sth iteration;

$\dddot{X}_{best,j}^{s}$ indicates optimal positions occupied by all vigilantes in the jth dimension at the time of the sth iteration;

$\dddot{X}_{worst,j}^{s}$ indicates worst positions occupied by all vigilantes in the jth dimension at the time of the sth iteration;

$f_{k,j}^{s}$ indicates a fitness value of the kth vigilante in the jth dimension in the sth iteration;

$f_{best,j}^{s}$ indicates optimal fitness values of all vigilantes in the jth dimension in the sth iteration;

$f_{worst,j}^{s}$ indicates worst fitness values of all vigilantes in the jth dimension in the sth iteration;

μ is a step size control parameter;

$K \in (0,1)$ is a random number;

ε is a constant.

7. The method of claim 6, wherein the operation S45 includes:

S451, determining, based on the distance between the end position and the initial position of each sparrow, and in combination with a flying speed of the sparrow, the flying time of the sparrow in this flight;

S452, by substituting the flying time into the navigation time optimization target function of the ship, obtaining the flying time optimization target function $J_{TM}$ of the sparrow:

$$J_{TM} = \left[1 + \frac{1 - \exp(-0.2 \times T_{M,alarm})}{1 + \exp(-0.2 \times T_{M,alarm})}\right] \times T_{M,total}$$

where, $T_{M,total}$ indicates a total flight time of a sparrow flying along a flying route;

$T_{M,alarm}$ indicates a warning time of the sparrow, that is, the time when the sparrow flies in the risk area of the flying route;

S453, by substituting the corresponding wind speed and the flying high into the ship route risk assessment function, based on a fact that the fitness value of the sparrow is affected by the wind speed on the flying route and the flying height of the sparrow during the flight, obtaining the sparrow route risk assessment function $r_{M,risk}$:

$$r_{M,risk} = \frac{1}{d} \sum_{j=1}^{d} \left(\alpha_M \times \frac{H_{M,j,wave}}{H_{M,max,wave}} + \beta_M \times \frac{V_{M,j,wind}}{V_{M,max,Wind}}\right)$$

where, $\alpha_M + \beta_M = 1$, $\alpha_M$ indicates a coefficient of the influence level of the flying height of the sparrow on the flying risk;

$\beta_M$ indicates a coefficient of the influence level of the wind speed on the flying risk;

$r_{M,risk}$ indicates the sparrow route risk assessment function;

d indicates the total number of flying route segments in the flying route;

$H_{M,j,wave}$ indicates a flying height of the sparrow in the jth flying route segment of the flying route;

$H_{M,max,wave}$ indicates a maximum flying height of the sparrow in the total flying route segments of the flying route;

$V_{M,j,wind}$ indicates a wind speed of the jth flying route segment in the flying route;

$V_{M,max,wind}$ indicates a maximum wind speed of the total flying route segment in the flying route;

the calculation formula of the sparrow total cost assessment function is as follows:

$$J_{M,cost} = w_1 J_{TM} + w_2 r_{M,risk}$$

where, $J_{M,cost}$ indicates the sparrow total cost assessment function; $w_1$ indicates a weight parameter of the flying time optimization target function of the sparrow $J_{TM}$, and $w_2$ indicates a weight coefficient of the sparrow route risk assessment function $r_{M,risk}$;

wherein the weight coefficient satisfies a following condition: $w_1 \geq 0$, $w_2 \geq 0$, $w_1 + w_2 = 1$.

8. The method of claim 7, wherein to prevent a position update of the sparrow in a later stage of the iteration from falling into a local optimum, an adaptive t distribution variation strategy is adopted for the position of the sparrow:

$$\dot{X}_{y,j}^{*} = \dot{X}_{y,j} + \dot{X}_{y,j} \times t(M)$$

$$\ddot{X}_{z,j}^{*} = \ddot{X}_{z,j} + \ddot{X}_{z,j} \times t(M)$$

$$\dddot{X}_{k,j}^{*} = \dddot{X}_{k,j} + \dddot{X}_{k,j} \times t(M)$$

where, t(M) indicates a t distribution with an iteration number S as a freedom level;

$\dot{X}_{y,j}^{*}$ indicates a position occupied by a yth discoverer in the jth dimension after the variation; $\dot{X}_{y,j}$ indicates a position occupied by a zth discoverer in the jth dimension;

$\ddot{X}_{z,j}^{*}$ indicates a position occupied by the zth follower in the jth dimension after the variation, and $\ddot{X}_{z,j}$ indicates a position occupied by the zth follower in the jth dimension;

$\ddot{X}_{k,j}{}^*$ indicates a position occupied by the kth vigilante in the jth dimension after the variation, and $\ddot{X}_{k,j}$ indicates a position occupied by the kth vigilante in the jth dimension.

\* \* \* \* \*